United States Patent
McRaven et al.

(10) Patent No.: US 11,282,247 B2
(45) Date of Patent: *Mar. 22, 2022

(54) OBJECT TIME SERIES SYSTEM

(71) Applicant: Palantir Technologies Inc., Denver, CO (US)

(72) Inventors: John McRaven, New York, NY (US); Francis Chen, New York, NY (US); Shuyang Li, New York, NY (US); Spencer Tank, New York, NY (US); Xavier Falco, London (GB)

(73) Assignee: PALANTIR TECHNOLOGIES INC., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/129,442

(22) Filed: Dec. 21, 2020

(65) Prior Publication Data

US 2021/0150786 A1   May 20, 2021

Related U.S. Application Data

(63) Continuation of application No. 16/387,392, filed on Apr. 17, 2019, now Pat. No. 10,902,654.
(Continued)

(51) Int. Cl.
*G06F 17/00* (2019.01)
*G06T 11/20* (2006.01)
(Continued)

(52) U.S. Cl.
CPC ........ *G06T 11/206* (2013.01); *G06F 11/3089* (2013.01); *G06F 11/32* (2013.01); *G06F 16/367* (2019.01); *G06F 16/383* (2019.01)

(58) Field of Classification Search
CPC combination set(s) only.
See application file for complete search history.

(56) References Cited

U.S. PATENT DOCUMENTS

| 7,113,190 B2 | 9/2006 | Heaton |
| 7,667,582 B1 | 2/2010 | Waldorf |

(Continued)

OTHER PUBLICATIONS

Steiger et al., Visual Analysis of Time-Series Similarities for Anomaly Detection in Sensor Networks, EuroVis, 2014, vol. 33, 3, p. 401-410. (Year: 2014).*

(Continued)

*Primary Examiner* — Andrew T McIntosh
(74) *Attorney, Agent, or Firm* — Knobbe, Martens, Olson & Bear LLP

(57) ABSTRACT

Methods and systems for structuring, storing and displaying time series data in a user interface. One system includes processors executing instructions to determine, from time series data from a first sensor, a first subset of time series data for the first batch from the first start time and the first end time, determine, from the time series data from the first sensor, a second subset of time series data for the second batch from the second start time and the second end time, generate a time series user interface comprising a chart, the chart including a first plot for the first subset of time series data and a second plot for the second subset of time series data, the first plot being aligned to the second plot, and cause presentation of the time series user interface.

20 Claims, 11 Drawing Sheets

Related U.S. Application Data

(60) Provisional application No. 62/660,790, filed on Apr. 20, 2018.

(51) Int. Cl.
*G06F 16/36* (2019.01)
*G06F 16/383* (2019.01)
*G06F 11/30* (2006.01)
*G06F 11/32* (2006.01)

(56) References Cited

U.S. PATENT DOCUMENTS

| | | |
|---|---|---|
| 7,840,937 B1 | 11/2010 | Chiluvuri |
| 7,961,189 B2 | 6/2011 | Tolle et al. |
| 8,520,000 B2 | 8/2013 | Duncker et al. |
| 9,041,716 B2 | 5/2015 | Ogles et al. |
| 10,895,972 B1 | 1/2021 | Apostolatos et al. |
| 10,902,654 B2 | 1/2021 | McRaven et al. |
| 2002/0063733 A1 | 5/2002 | Franke et al. |
| 2002/0156806 A1 | 10/2002 | Cox et al. |
| 2005/0232055 A1 | 10/2005 | Couckuyt |
| 2007/0126736 A1 | 6/2007 | Tolle et al. |
| 2007/0203945 A1 | 8/2007 | Louw |
| 2007/0245238 A1 | 10/2007 | Fugitt et al. |
| 2008/0109740 A1 | 5/2008 | Prinsen et al. |
| 2008/0134059 A1 | 6/2008 | Kumar et al. |
| 2010/0005411 A1 | 1/2010 | Duncker et al. |
| 2010/0058250 A1 | 3/2010 | Stannard et al. |
| 2010/0214299 A1 | 8/2010 | Robertson et al. |
| 2010/0251128 A1 | 9/2010 | Cordasco |
| 2010/0283606 A1 | 11/2010 | Tsypin et al. |
| 2011/0041087 A1 | 2/2011 | Leveille et al. |
| 2013/0096944 A1* | 4/2013 | Shah ............... G16H 10/60 705/3 |
| 2017/0139558 A1* | 5/2017 | Cervelli ............ G06F 3/04842 |
| 2017/0164580 A1 | 6/2017 | Rettedal et al. |
| 2019/0171775 A1 | 6/2019 | Martin et al. |
| 2021/0141542 A1 | 5/2021 | Apostolatos et al. |

OTHER PUBLICATIONS

Official Communication for European Patent Application No. 19170253.9 dated Mar. 24, 2021, 8 pages.

U.S. Appl. No. 17/122,308, Object Time Series System and Investigation Graphical User Interface, filed Dec. 15, 2020.

* cited by examiner

OBJECT TIME SERIES SYSTEM

TECHNICAL FIELD

The present disclosure relates to systems and techniques for data integration and analysis, which may, in some embodiments include indexing time series sensor data for subsequent retrieval, analysis and possibly control of one or more technical systems based on the analysis.

BACKGROUND

Sensor systems monitoring processes or operations of a system can collect time series data, which may include numerous sensed data samples and a corresponding time indication of when each data sample was collected. Time series data may be related to a number of characteristics and properties, for example, including temperature, pressure, pH, light, infrared (IR), ultraviolet (UV), acceleration, dissolved oxygen, optical clarity, $CO^2$, motion, rotational motion, vibration, sound, voltage, current, capacitance, electromagnetic radiation, altitude, fluid flow, radiation, optical, and moisture, proximity and the like. In different contexts, the collection of the time series data from a plurality of sensors can correspond a discrete grouping of events (or a batch) such as a trip or segment of a trip (e.g., sensors on a vehicle during a trip), a chemical reaction in a plant or factory, or a product assembly in a factory.

However, from the perspective of sensors gathering time series data, there may not be a concept of a discrete grouping of events in the time series data but rather a large stored data set that has the all of the time series data from a sensor lumped together. Furthermore, the large stored data set may not contain any relational information such that analysis of the time series data is unwieldly. Existing user interfaces to view and compare the time series data in grouping of events (or batches) are inadequate to manipulate the large amounts of time series data that can be generated during a batch because they require extensive manual setup and data preparation of the time series data, and are a slow and tedious process for a user, if even possible at all.

SUMMARY

Embodiments of systems and methods of a time-series interaction user interface are disclosed herein. Time series data can be stored and indexed according to an object-orientated model in a grouping of events in a process or evolution, which may be referred to as a "batch." The object-orientated model for each batch may include properties indicative of a start and stop time (and/or date) of the batch, and multiple time series associated with each batch. For example, multiple time series sensor data, and/or corresponding quality data and determined information associated with each batch. The object-orientated model may allow computer-implemented indexing of portions of time series sensor data for subsequent retrieval and comparison, for example by using the user interface to display and allow user interaction with identified portions of time series sensor data and other corresponding information, from different batches. In some embodiments, comparison of said time series sensor data may be automatically performed against certain pre-conditions or rules, whether or not it is displayed in the user interface.

In one innovation, a system includes a first non-transitory computer storage medium configured to at least store for a plurality of batches: (i) first time series object data comprising a first start time and a first end time for a first batch, and (ii) second time series object data including a second start time and a second end time for a second batch, a second non-transitory computer storage medium configured to at least store computer-executable instructions, and one or more computer hardware processors in communication with the second non-transitory computer storage medium. The one or more computer hardware processors are configured to execute the computer-executable instructions to at least: determine, from time series data from a first sensor, a first subset of time series data for the first batch from the first start time and the first end time, determine, from the time series data from the first sensor, a second subset of time series data for the second batch from the second start time and the second end time; generate a time series user interface comprising a chart, the chart comprising a first plot for at least a portion of the first subset of time series data and a second plot for at least a portion of the second subset of time series data, wherein the first plot is aligned to the second plot; and cause presentation of the time series user interface.

In some embodiments, the one or more computer hardware processors may be further configured to execute the computer-executable instructions to identify from the aligned first and second plots a predetermined condition and, responsive thereto, to issue on the time series user interface an alert as to the state of the first sensor or a technical system indicated by the time series data from the first sensor. The one or more computer hardware processors may be further configured to execute the computer-executable instructions to issue on a time series user interface of the technical system one or more user-interactive options to control the technical system based on the state of the first sensor or a technical system indicated by the time series data from the first sensor, for example to pause or turn-off the first sensor or the technical system.

In some embodiments, the one or more computer hardware processors of the system are further configured to execute the computer-executable instructions to receive and store user input plot display range data for at least one of the first plot and the second plot, and in response to receiving the user data generate a time series user interface comprising a chart using the stored user input plot display range data, the chart comprising a first plot for the first subset of time series data and a second plot for the second subset of time series data, wherein the first plot is aligned to the second plot. The first plot and the second plot may be temporally aligned. The temporal alignment of the first plot to the second plot aligns the portion of the first subset of time series data with the portion of the second subset of time series data in the chart in a vertical or horizontal corresponding direction such that points of the first plot and the second plot along the corresponding direction represent the same point in time relative to the start of the respective first batch and second batch. In some embodiments, the wherein the user input display range data indicates a period of time, for example, seconds, minutes, hours, days, weeks, or months. In some embodiments of the system, the first start time and first end time represent instances in time, the first end time being after the first start time, and the time between the first start time and the first end time being a first time period, the second start time and second end time represent instances in time, the second end time being after the second start time, the time between the first start time and the first end time being a second time period, and the first start time and the second start time are different instances in time, and the first end time of the second end time are different instances in time.

In some embodiments of such systems, the one or more computer hardware processors are further configured to execute the computer-executable instructions to generate the time series user interface such that the first start time of the first subset of time series data in the first plot and the second start time of the second subset of time series data in the second plot are graphically aligned in the chart. In some embodiments of these systems, the one or more computer hardware processors further configured to execute the computer-executable instructions to generate the time series user interface such that first plot and the second plot are aligned, having the first subset of time series data in the first plot and the second subset of time series data in the second plot shown in the chart as beginning at a same relative time. In some embodiments of these systems, the one or more computer hardware processors are further configured to execute the computer-executable instructions to receive and store user input plot display range data for at least one of the first plot and the second plot, and in response to receiving the user data generate a time series user interface including a chart using the stored user input plot display range data, the chart including a first plot of the first portion of the first subset of time series data and a second plot of the second portion of the second subset of the second time series data, wherein the first plot is aligned to the second plot.

In some embodiments of such systems, the one or more computer hardware processors are further configured to execute the computer-executable instructions to determine, from time series data from a second sensor, a third subset of time series data for the first batch from the first start time and the first end time of the first batch, determine, from the time series data from the second sensor, a fourth subset of time series data for the second batch from the second start time and the second end time of the second batch, and cause presentation of the time series user interface, where the chart further comprises a first plot for the third subset of time series data and a second plot for the fourth subset of time series data, wherein the first plot is aligned and comparable to the second plot. In some embodiments of these systems, the one or more computer hardware processors are further configured to execute the computer-executable instructions to determine, from time series data from one or more additional sensors, a corresponding number of one or more additional subsets of time series data for the first batch from the first start time and the first end time of the first batch, determine, from the time series data from the one or more additional sensors, a corresponding number of one or more additional subsets of time series data for the second batch from the second start time and the second end time of the second batch, and cause presentation of the time series user interface, where the chart further comprises one or more additional plots corresponding to the one or more additional subsets of time series data, wherein the one or more additional plots are also aligned and comparable to the first plot and the second plot.

Another innovation includes a method of presenting time series data in a user interface, the method including storing first time series object data comprising a first start time and a first end time for a first batch, storing second time series object data comprising a second start time and a second end time for a second batch, using one or more computer hardware processors in communication with a second non-transitory computer storage medium configured to at least store computer-executable instructions, determining, from time series data from a first sensor, a first subset of time series data for the first batch from the first start time and the first end time, determining, from the time series data from the first sensor, a second subset of time series data for the second batch from the second start time and the second end time, generating a time series user interface comprising a chart, the chart comprising a first plot for at least a portion of the first subset of time series data and a second plot for at least a portion of the second subset of time series data, wherein the first plot is temporally aligned to the second plot, and causing presentation of the time series user interface. The temporal alignment of the first plot to the second plot may align the portion of the first subset of time series data with the portion of the second subset of time series data in the chart in a vertical or horizontal corresponding direction such that points of the first plot and the second plot along the corresponding direction represent the same point in time relative to the start of the respective first batch and second batch.

Various embodiments of the method may include certain aspects. In one aspect, the first time series object data includes the time series data for the first sensor and time series data for at least one other sensor for the first batch, and the second time series object data includes the time series data for the second sensor and time series data for at least one other sensor for the second batch. The method may further include receiving and storing user input plot display range data for at least one of the first plot and the second plot, where generating the time series user interface comprises, in response to receiving the user data, generating using the one or more computer hardware processors the time series user interface comprising the chart using the stored user input plot display range data.

The method may further include, using the one or more computer hardware processors, determining, from time series data from at least one additional sensor, at least a third subset of time series data for the first batch from the first start time and the first end time of the first batch, determining, from time series data from the at least one additional sensor, at least a fourth subset of time series data for the first batch from the first start time and the first end time of the first batch, and causing presentation of the time series user interface, where the chart further comprises additional plots corresponding to the at least one additional sensor, wherein the additional plots are also temporally aligned and temporally aligned to the first plot and the second plot.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, the design of computer user interfaces that are useable and easily learned by humans is a non-trivial problem for software developers. The various embodiments of interactive and dynamic user interfaces of the present disclosure are the result of significant research, development, improvement, iteration, and testing. This non-trivial development has resulted in systems, methods and/or user interfaces described herein which may provide significant performance and control benefits. For example, embodiments may involve indexing portions of time-series sensor data as data objects for subsequent identification and retrieval such that two or more selected portions may be aligned, which is useful for visualization of corresponding time series data to identify, for example, erroneous or surprising conditions (which may prompt further interaction through the interactive user interface, for example to shut down or take off-line a technical system or sensor) but, in some circumstances, may allow control of one or more technical system or sensors to be performed automatically. For example, user interaction with the interactive user interfaces described herein may provide an optimized display of time-series data and may enable a user to more quickly access, navigate, assess, and digest such information than previous systems, and may guide and/or prompt users to take one or more affirmative actions to control one or more systems or sensors based on the displayed time-series data.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, averages, correlations, and other statistical information. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described herein in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

Overview

Technical Problem

Figure 1:
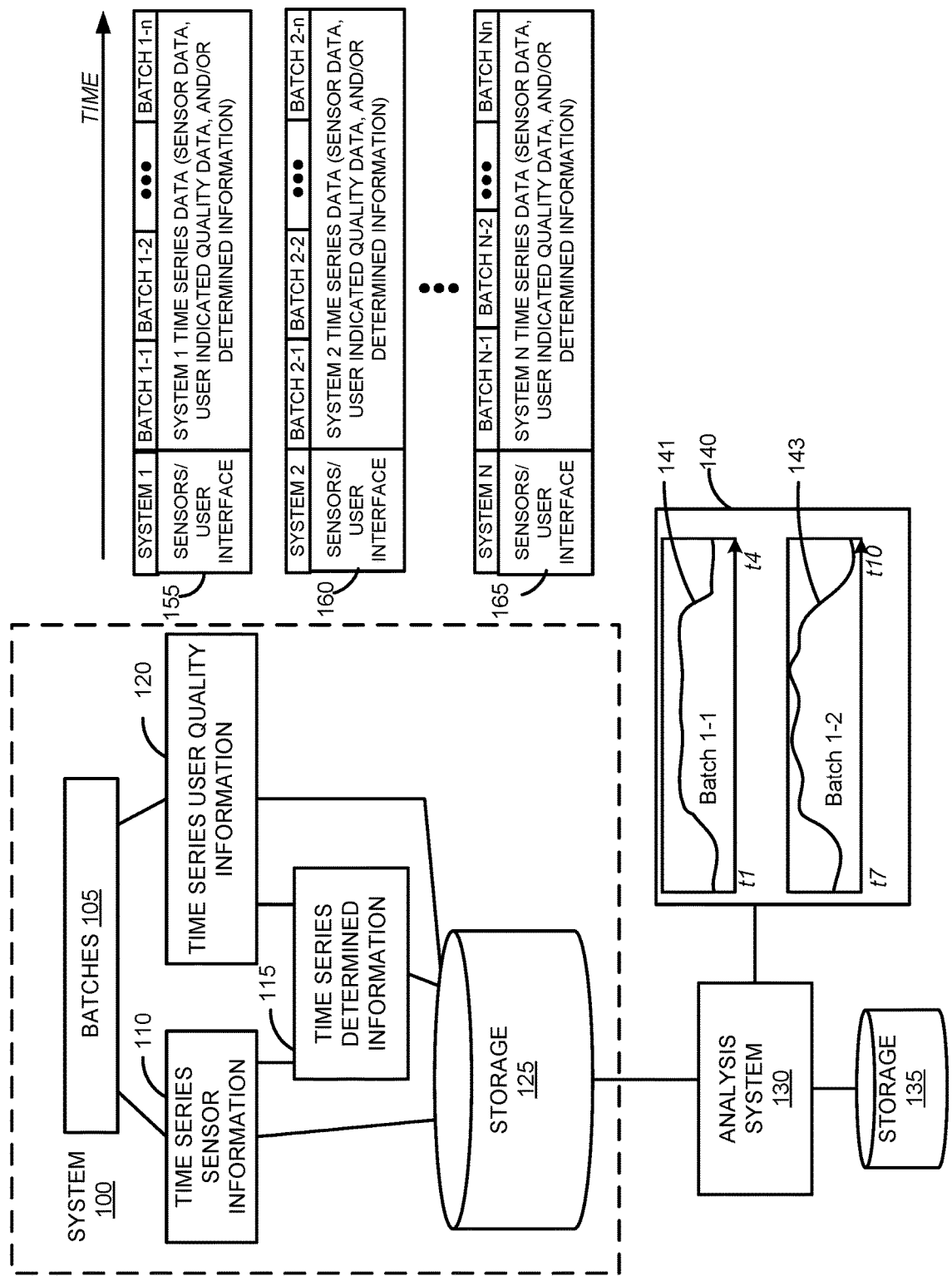
FIG. 1 illustrates an example of a schematic of an overview of collecting, storing data in a data store, and displaying corresponding time series data from multiple batches in a user interface, and illustrates one view of relationships between multiple batches run on multiple systems, and time series data corresponding to the batches that can include sensor data, user input data, and information determined from inputs from one or more sources.

Sensors can collect time series data. In particular, sensor systems monitoring processes or operations of a system can collect time series data, which may include numerous sensed data samples and a corresponding time indication of when each data sample was collected. In different contexts, the collection of the time series data from sensors can correspond to discrete a discrete grouping of events (or batch) such as a trip or segment of a trip (e.g., sensors on a vehicle during a trip), a chemical reaction in a plant or factory, sensor data for a piece of machinery (e.g., industrial equipment or a home water heater), or a product assembly in a factory. However, from the perspective of sensors gathering time series data, there may not be a concept of a discrete grouping of events in the time series data but rather a large data set that has the all of the data lumped together. Existing analysis systems, control systems and user interfaces to view and compare the time series data in grouping of events (or batches) are inadequate to manipulate the large amounts of time series data that can be generated during a batch because they require extensive manual setup and data preparation of the time series data, and are a slow and tedious process for a user. However, from the perspective of sensors gathering time series data, there may not be a concept of a discrete grouping of events in the time series data but rather a large stored data set that has the all of the time series data from a sensor lumped together. Furthermore, time series data set can be large, unwieldy to analyze and difficult to compare, whether manually or automatically.

Solution

Time series data may be related to a series of events that occur within a time period, such as events or values obtained at successive times (of milliseconds, seconds, minutes, hours, etc.). Time series data may also be related to the number of times an event occurs during a time period (of milliseconds, seconds, minutes, hours, etc.). A time-series query and interaction user interface that supports object-orientated time series. The time-series data can be stored according to an object-orientated model in a grouping of events, such as batches. The object-orientated model for each batch includes properties such as a start and stop time, and multiple time series associated with each batch, such as multiple time series sensor data associated with each batch. A user can setup the object-orientated model in a user interface. The time-series query user interface can receive particular batches, such as batch identifiers, and automatically construct queries and user interfaces for the batches using the object-orientated model. In particular, for a received batch identifier or grouping of batch identifies and batch type, a data model can be retrieved that specifies the start and stop times for the time series and which time series (e.g., for particular sensors) should be retrieved.

The time series user interface system can then automatically index portions of time series, construct the time series user interfaces according to the object-orientated model and the retrieved time series data. For example, using the start and stop times for multiple time series for the same batch type, the system can automatically time shift each of the respective time series so a user and/or analysis system can compare and contrast multiple batches at the same time. This may prompt the user, and/or analysis system, based on the comparing, to control one or more systems and/or sensors in response, for example, to identifying a predetermined condition or state made evident by the comparison.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Data Store: Any computer readable storage medium, component, and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a batch (see below), a sensor, a person, a place, an organization, a market instrument, or other noun. A data object can represent an event or a group of events that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Batch Type, Sensor Type, Person, Event, or Document). Object types may be defined by an ontology and may be modified or updated to include additional object types. An object definition (e.g., in an ontology) may include how the object is related to other objects, such as being a sub-object type of another object type (e.g., a particular batch type can be associated with one or more other sensor types, or an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Batch: As used herein is a broad term that refers to something that changes over time. A batch generally is associated with a start time and an end time, and may be monitored over a time period to collect data, the data being associated with a time during the batch (e.g., collected at an instance of time, or collected during a period of time during the batch). Time series data is an example of data that may be associated with a batch. In one example, a batch may refer to a process where a material or substance is subject to one or more events (or processes) that cause one or more changes to the material or substance, for example, a grouping of related events processes or operations may comprise a batch. In another example, a batch may refer to the occurrence of a certain thing, a certain event, or portion of an event, that occurs numerous times. For example, the event of a train traveling from Chicago to Milwaukee may be referred to as a batch, and information that occurs on the train relating to the train itself (e.g., mechanical information), or to anything that happens on the train (e.g., passengers getting on and off, money spent in the restaurant car, communications made via the trains Wi-Fi network, etc.) can be part of the data collected for the batch.

In another example, the instances when a submarine submerges between 33 feet and 330 feet may be referred to as a batch, and during such a batch numerous data may be collected regarding the equipment operating on the submarine, or information relating to integrity of the hull may be collected. In another example, a batch may refer to a circumstance or situation when a system, or a portion of a system, operates and is monitored over a period of time. In another example, a car driving from point A to Point B, or for a certain duration of time, can be referred to as a batch. Similarly, a system operating (e.g., to heat water, refine oil, make food products, travel from point A to point B, etc.) may be referred to as a batch. In another example, the processing of a material (any substance, e.g., water, beer, concrete, oil, produce, paint, etc.) being operated on by a system may also be referred to as a batch. One or more sensors or processes can be used to collect data associated with a batch, and/or one or more users can monitor a batch and provide input to a batch.

A portion of an event or process may also be referred to batch if information is collected during the event or process. For example, a batch may refer to a baseball pitch/hit event, where a movement of a baseball (e.g., position, velocity, trajectory, rotation, etc.) is monitored as it travels from the pitcher's hand to the batter, and then from the batter's bat to the outfield. A batch may also refer to a portion of the baseball pitch/hit event, for example, only the portion from where a bat hits the baseball and the baseball travels to the outfield. In some cases, batch data may be collected for a baseball pitch/hit event and then later it is decided to look at a portion of the collected data as a separate batch, for example, only the portion of the movement of the baseball after the baseball is hit by the bat. In such cases, the pitch/hit batch can be analyzed by storing as separate metadata the exact start and end times of each time during a game a baseball leaves the pitcher's hand, gets hit by the bat and travels to the outfield during a pitch/hit event. By generating and storing said metadata, a search can be done on the data. For example, subsequently, a search can be done on the pitch/hit event batch data to identify a set of start/stop times when the baseball is hit by the bat and has traveled 100 feet from the batter, and those can be considered to be a set of batches and analyzed.

In some embodiments, a user can also monitor a batch and characterize the batch at one or more time instances over a period of time, e.g., characterize the quality of the batch, or how well the batch is operating. In some embodiments, additional information relating to the batch may be determined. For example, determined information may be generated by a combination of data from two or more sensors, or by taking a sample of a substance that is associated with the batch and performing quality analysis of the substance. In another example, determined information may be generated by a combination of data from one or more sensors and user input (e.g., a user input characterizing quality). A batch may be represented as a data object, or as a collection of data objects, where characteristics of the batch, (e.g., identification, start time, end time, time series data collected by each sensor, and the like) may be represented as a data object.

Event: An occurrence that takes place over a time period, where time series data can be collected during the occurrence. An event may have a start time and/or an end time, or at least an indicated (or identified) start time and/or end time. An event generally occurs at a location. For some events, the location may cover a large geographic area. For example, an earthquake, ocean tides, and a space station falling out of orbit are examples of events that may occur across a large geographic area, and including above and below the earth's surface. For some other events, the location may be at a specific place, for example, a factory, an office, a home, outside or at a business. For example, baking a cake, the operation of an autonomous vehicle on a route, the actuation of a valve in a cooling system, heating liquid in a container, a cutting operation on a piece of industrial equipment, a particular operation of a system (or machinery) in a facility, a lap of a motorcycle around a race track, and a homerun are examples of events that occur that can occur at a specific place. An event may be characterized by two or more portions that may be referred to as sub-events or phases of the event. In some examples, a batch may undergo a change during one or more events.

Time Series Data: A series of information referenced to time. For example, a series of information that is sensed, collected, determined, and/or stored over a period of time, such that the information may be referenced by the time that it was sensed, collected, determined, and/or stored. As used herein in reference to time series data, "information" is a broad term that may include sensor information and/or other types information that is collected either in reference to an instance of time or during a defined time period (e.g., milliseconds, seconds, minutes, hours, days, weeks, months, years, etc.). Time series data can include the number of times an event occurs during a time period. Some examples of time series data are provided here, but these examples are not meant to limit the type of information that can be included in time series data. In some examples, time series of information may be generated by a sensor monitoring a characteristic, for example, temperature, pressure, pH, light or radiation, dissolved oxygen, carbon dioxide, gas composition, size, vibration, or movement. In some examples, time series data may be a count of a certain occurrence over a designated period of time, e.g., the number of people that pass through a turnstile every minute during a week; the number of cars that travel past a certain location in a city every five minutes for a year; the count of telephone calls a call center during consecutive 15 minute periods for a year; and the amount of money all the cash registers of a store collect during 30 minute time periods for a year; or the number of times a certain computer operation occurs (e.g., an error log or message is generated, a query is made, a certain communication is made) in a certain time period. In some examples, the series of information is determined by using data from one sensor and other information, for example, data from another sensor or stored data. In another example the series information is determined by a user's input, for example, where the user input is a quality characterization.

Object-Centric Data Model

FIG. 1 is a schematic showing an example of collecting, storing data, and displaying time series data corresponding to multiple batches in a user interface, such that the time series data of each batch is aligned to have the same relative start time. The example batches described in reference to FIG. 1 may be anything that changes and that can be monitored over time. While the embodiments of interfaces and operations disclosed in reference to FIG. 1 and the other figures may illustrate or refer to certain examples of batches, the disclosure is not limited to such illustrated examples but instead relates to any of the types of batches, as defined and described herein. Batches 105 are monitored over time by system 100. Several types of information are collected as the batches are subject to one or more various events or conditions that may affect or change the batches 105. Time series sensor information 110 is collected by one or more sensors monitoring the batches. The time series information 110 can include sensed data for each sensor monitoring the batches 105, and time data that corresponds to the sensed data. For example, for every sensed data sample collected by each sensor, corresponding time information for the sensed data sample is also collected. The time information may include the date when the sensed data sample was collected and the time the sensed data sample was collected. In some examples, the time information is a timestamp that represents the hour, minute, seconds, and fractions of a second, when the sensed data sample was collected.

FIG. 1 also illustrates time series user quality information 120 that is associated with the batches 105. The time series user quality information 120 may include time referenced input that a user makes relating to a condition of a batch. For example a user may make a visual observation of a batch and enter that data at the time the observation was made. In another example where the batch is a material, a user may draw a sample of a batch and perform one or more tests or processes on the sample to characterize a quality of the batch. Such quality characteristics may, include but is not limited to, a user observation based on a user's vision, hearing, smell, taste, or touch. In some instances, the quality information is based on the user's experience.

Also, in some examples, time series determined information 115 relating to a batch may also be generated. The time series determined information 115 includes a time reference indicating when the determined information was generated, and the determined information itself, which may be based on two or more sources including, for example, time series sensor information of one or more sensors and/or time series user quality information. In some examples sensor information from one or more sensors is used with a predetermined algorithm to generate the time series determined information. In some examples, the time series determined information 115 is generated using one or more sensors and previously stored information, for example, information on previously run batches.

Time series sensor information 110, time series determined information 115, and time series user quality information 120, may be stored in a storage component 125. In some examples storage component 125 is geographically located with the batches 105 in an information collection system 100. As further illustrated in FIG. 1, storage component 125 is in communication with analysis system 130, which may be co-located with storage component 125, or at another location. Analysis system 130 may be coupled to a storage component 135 which can be used to store any of the time series information, for example, as a working copy of the time series information 110. Analysis system 130, may process time series sensor information 110, time series determined information 115, and/or time series user quality information 120 in accordance with one more data models, defined by an ontology, for storage of data in one or more databases, as further described in reference to FIGS. 2-5. Storing the time series information in a data model facilitates indexing, for example to create an index of which data models representing which time series information is stored, as well as where it is stored, to enable quickly accessing the time series information for certain time periods, which accessed time series data can be aligned, and facilitates generating user interfaces comprising plots of the time series information to compare information, such as sensor data, from one or more retrieved batches and/or automatic comparison using computer-analysis techniques based on the fact that the data models being compared have known data structures and are aligned in time.

FIG. 1 also illustrates that multiple batches may be on multiple systems, and time series data corresponding to the batches that can include sensor data, user input data, and information determined from inputs from one or more sources. In some examples of systems monitoring batches, multiple batches may be "run" in series on a system 155 (e.g., one after the other) such that the same sensors that are used to monitor and collect time series data for batch 1-1 are also used to monitor and collect time series data for batch 1-2, . . . , batch 1-n.

In other examples of systems monitoring batches, multiple batches may be run in parallel on each of multiple systems 155, 160, and 165. Multiple sensors for a first system 155 monitor and collect time series data for batch 1-1, batch 1-2, . . . , and batch 1-n. Multiple sensors multiple sensors for a second system 160 monitor and collect time series data for batch 2-1, batch 2-2, . . . , and batch 2-n. Multiple sensors multiple sensors for a third system 165 monitor and collect time series data for batch N-1, batch N-2, . . . , and batch N-n.

All of the collected time sensor data that is associated with systems 155, 160, and 165 can be stored in one or more databases in accordance with one or more data models, as described in more detail in reference to FIGS. 2-6. For example, time series data may be stored in a type of data object in accordance with an object definition that includes how the data is related to other objects. Data objects may be defined in various ways depending on a particular implementation to facilitate analyzing and comparing the generated time series data. For example, each of the batches may be stored as a data object that includes a batch identifier, the batch start time, the batch end time, and identifiers for one or more events that are associated with the batch. In another example, each time series data stream generated by a sensor may be stored as a data object, in such a data object may include a sensor identifier, a system identifier indicating what system the sensor is associated with, the sensed data generated by the sensor, and time information corresponding to the sensed data generated by the sensor. In another example, time series data that includes user indicated quality data may be stored as a data object that includes a batch identifier, a system identifier, quality data, and time information corresponding to the quality data provided by the user. In another example, time series data that includes determined information may be stored as a data object that includes a batch identifier, system identifier, quality data, and time information corresponding to the determined information.

Analysis system 130 may include user input devices that allow a user to identify certain sensor information of certain batches for display in comparison on a user interface 140, for example, by event or by a time period. The time references t1, t4, t7 and t10 refer to instances of time on the same time continuum, such that t4 occurred after t1, t7 occurred after t4, and t10 occurred after t7. As illustrated in FIG. 1, user interface 140 is displaying a plot of time series sensor data corresponding to batch 1, from time t1 to time t4. User interface 140 is also displaying a plot of time sensor data 143 corresponding to batch 2, from time t7 to time t10. In this example, time period t1 to time t4 corresponds to the time of a certain event occurring for batch 1, while the time period from t7 to t10 may correspond to the time of the same event occurring for batch 2 but later in time as the starting time for the event for batch 1 occurred at t1 and the starting time for the event for batch 2 occurred at t7. Because the time series data has been saved in a data model, the user interface can display the sensor data 141 for batch 1 and the sensor data for batch 2 for the same event such that the time series data is aligned as starting at the same (relative time) for easier comparison. In terms of comparison, one or more predetermined conditions may form part of the analysis system 130 enabling computer-implemented detection of an event, such as a fault. For example, if the sensor data 141 for batch 1 varies significantly (e.g. greater than a percentage difference, as specified by a user, or by default) from the sensor data 143 for batch 2, at a corresponding time, then this may be flagged as a fault rather than something more benign. A prompt may be issued to the user interface 140 to inform the user as to the fault, or in some embodiments, the prompt may give the user the option of controlling the associated system or sensor(s) in some way, for example to shut them down or to schedule maintenance. In some embodiments, a variation between time-aligned sensor data 141, 143 may be compared with historical patterns of variation to identify one or more known fault conditions, which may be provided on the user interface 140.

In an implementation, the system 100 (or one or more aspects of the system 100) may comprise, or be implemented in, a "virtual computing environment". As used herein, the term "virtual computing environment" should be construed broadly to include, for example, computer readable program instructions executed by one or more processors (e.g., as described in the example of FIG. 7) to implement one or more aspects of the modules and/or functionality described herein. Further, in this implementation, one or more components of the system 100 may be understood as comprising one or more rules engines of the virtual computing environment that, in response to inputs received by the virtual computing environment, execute program instructions to modify operation of the virtual computing environment. For example, a request received from the user computing device may be understood as modifying operation of the virtual computing environment to cause the request access to a resource from the system 100. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system 100. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system 100 as a virtual computing environment may advantageously enable executing different aspects or modules of the system on different computing devices or the system 100 as a virtual computing environment may further advantageously enable sandboxing various aspects, data, or modules of the system from one another, which may increase security of the system by preventing, e.g., malicious intrusion into the system from spreading. Implementing one or more aspects of the system 100 as a virtual computing environment may further advantageously enable parallel execution of various aspects or modules of the system, which may increase the scalability of the system. Implementing one or more aspects of the data the system 100 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Figure 2:
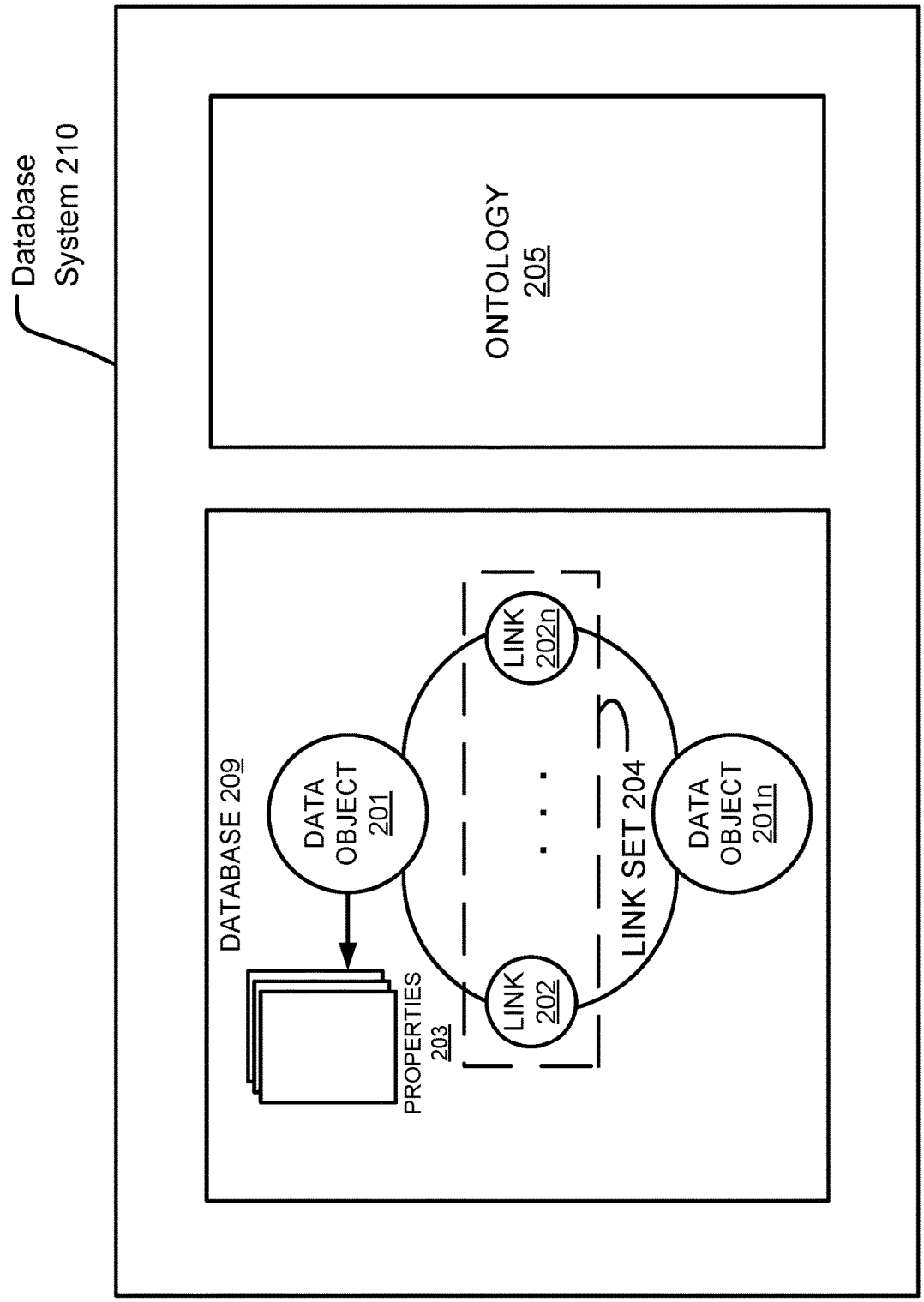
FIG. 2 illustrates one embodiment of a database system using an ontology.

FIG. 2 illustrates one embodiment of a database system using an ontology. An ontology may provide a data model for storage of time series data and information, for example, as described in reference to FIGS. 1, 2, and 8-10. To provide a framework for the discussion of specific systems and methods described herein, an example database system 210 using an ontology 205 will now be described in reference to FIG. 2. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

FIG. 2 also illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 209.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27, 2009 (e.g., a property of type "date") may be stored in the database 209 as an event object with associated currency and date properties as defined by the ontology 205. In another example of an event object, a batch (e.g., an object of type "batch") in a process step or location in the process (e.g., a property of type "event") starting on Mar. 27, 2009 (e.g., a property of type "date") at 0805:00 (e.g., a property of type "start time") and completing on Mar. 27, 2009 (e.g., a property of type "date") at 1515:15 (e.g., a property of type "time") on (or monitored by) system 1 (e.g., a property type of "system"). In another example, a specific sensor (e.g., an object of type "sensor") used in a system (e.g., a property of type "system") can collect time series data (e.g., a property of type "data") along with times associated with the data (e.g., a property of type "time"). The data objects defined in the ontology 205 may support property multiplicity. In particular, a data object 201 may be allowed to have more than one property 203 of the same property type. For example, a "Person" data object might have multiple "Address" properties or multiple "Name" properties. In another example, a batch in a process run may have multiple "sensor" properties indicating that multiple sensors collected monitored the batch to collect time series data.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. In one embodiment, when two data objects are connected by an event, they may also be connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In another example, two "Batch" data objects representing two batches that were monitored by the same system may both have a "Sensor" property that indicates the sensor that was used to monitor each of the batches. If both batches were monitored by the same system (e.g., at different times), then both batches may have one or more "Sensor" properties that are likely similar, if not identical, indicating one or more of the same sensors were used to collect time series data for each of the batches. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Figure 3:
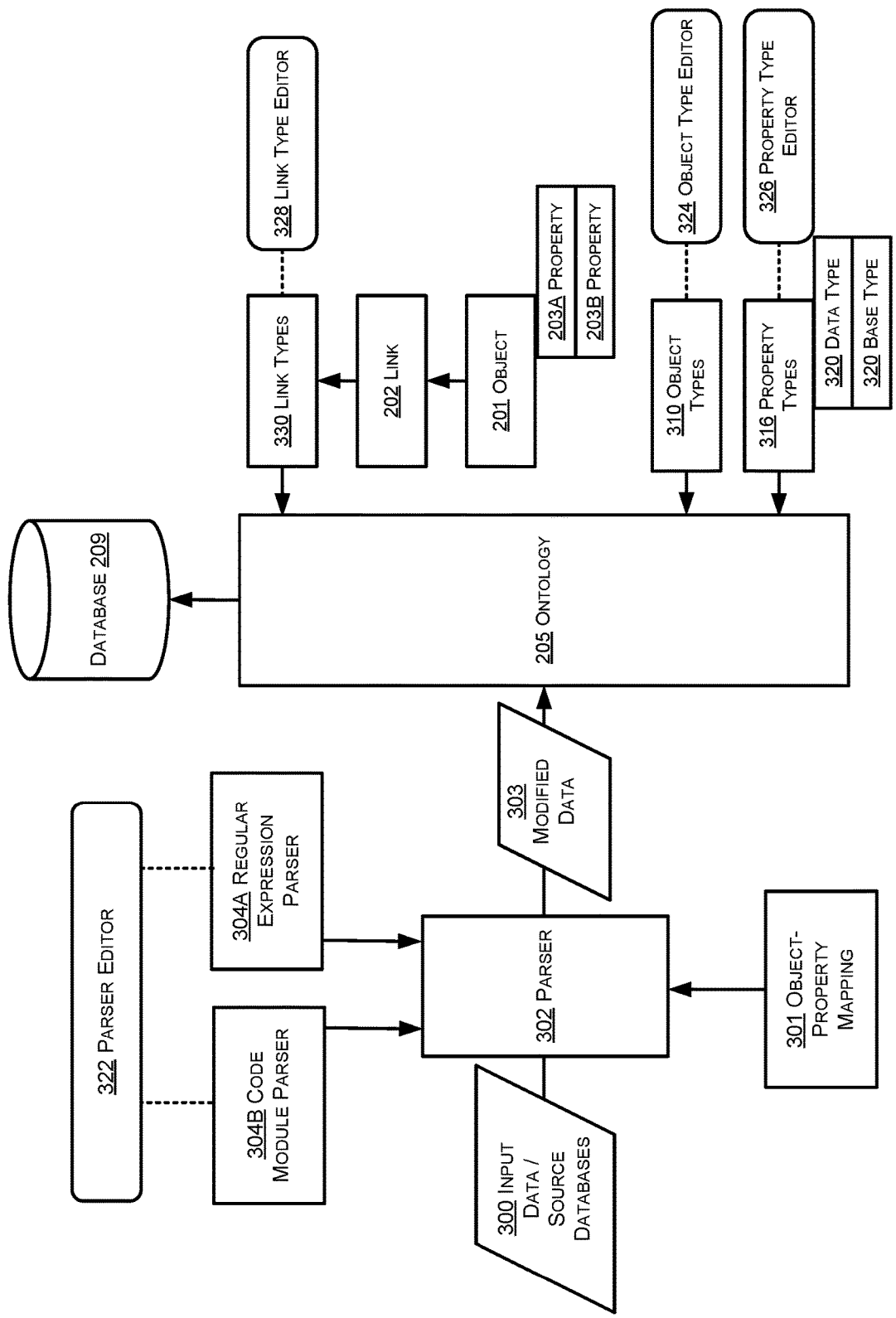
FIG. 3 illustrates one embodiment of a system for creating data in a data store using a dynamic ontology.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. In another example, a system performing a process may be in communication with one or more databases with information about sensors that monitor the process and phases of the process. The databases may contain a variety of related information and attributes of each type of data, for example, related to multiple sensors that collect data during the process, phases of the process, data sensed by a sensor, time stamps of sensor data, and corresponding information related to the process or particular phases of the process. The parser 302 is able to read a variety of source input data types and determine which type of data it is reading.

In accordance with the discussion above, the example ontology 205 comprises stored information providing the data model of data for storage of data in database 209. The ontology 205 stored information provides a data model having one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 426 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to ontology 205 by storing values of the new or modified data in a property of the specified property type. As a result, input data 300 having varying format or syntax can be created in database 209. The ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

A user interface may show relationships between data objects. Relationships between data objects may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

In addition to visually showing relationships between the data objects, a user interface may allow various other manipulations. For example, the objects within a database 209 may be searched using a search interface (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations. For example, by performing one or more filtering and/or aggregation functions on the time series data represented by the objects, some sort of time-varying baseline may be generated, indicative of expected data with respect to time, from which erroneous data can be detected either manually or automatically, for example with respect to a predetermined or default outlier conditions.

Advantageously, the present disclosure allows time series sensor data to be indexed in a more useful way (as data objects with start and end times) to permit meaningful alignment, for users to interact and analyze electronic data in a more analytically useful way and/or for computation analysis to be performed in a more useful way, for example to detect conditions requiring attention. Graphical user interfaces allow the user to visualize otherwise difficult to define relationships and patterns between different data objects. In the example of a system performing a process numerous times and being in communication with one or more databases with information about sensors that monitor the process and phases of the process, a graphical user interface can display time series sensor data of one or more sensors for corresponding times in selected processes at selected times to compare the sensor data from process to process. That is, the time series sensor data for two or more processes can be computer-analyzed and/or displayed in a plot in a relative time scale such that the data at the beginning of each plot is aligned to be at the same point in the process to help manually and/or automatically identify differences in the processes. Such time series sensor data has been parsed and stored in one or more data objects with properties and relationships as defined by an ontology. This allows a user, through the user interface, to quickly and easily select for display in one or more plots aligned time series sensor data of certain sensors, processes (or batches), systems etc., and at a desired scale/time period of the displayed. The present disclosure allows for easier comparison of time series data that was generated at times, and/or in different systems. The present disclosure also allows faster analysis of time series data by allowing quick and accurate access to selected portions of time series sensor data which may have been collected by different sensors in different systems, or the same sensors of the same system but during different processes of a repetitively run process. Without using the present disclosure, quickly selecting, displaying, and analyzing time series data, and making use of known relationships associated with time series data, would be virtually impossible given the size and diversity of many users' present databases, (e.g. excel spreadsheets, emails, and word documents).

Figure 4:
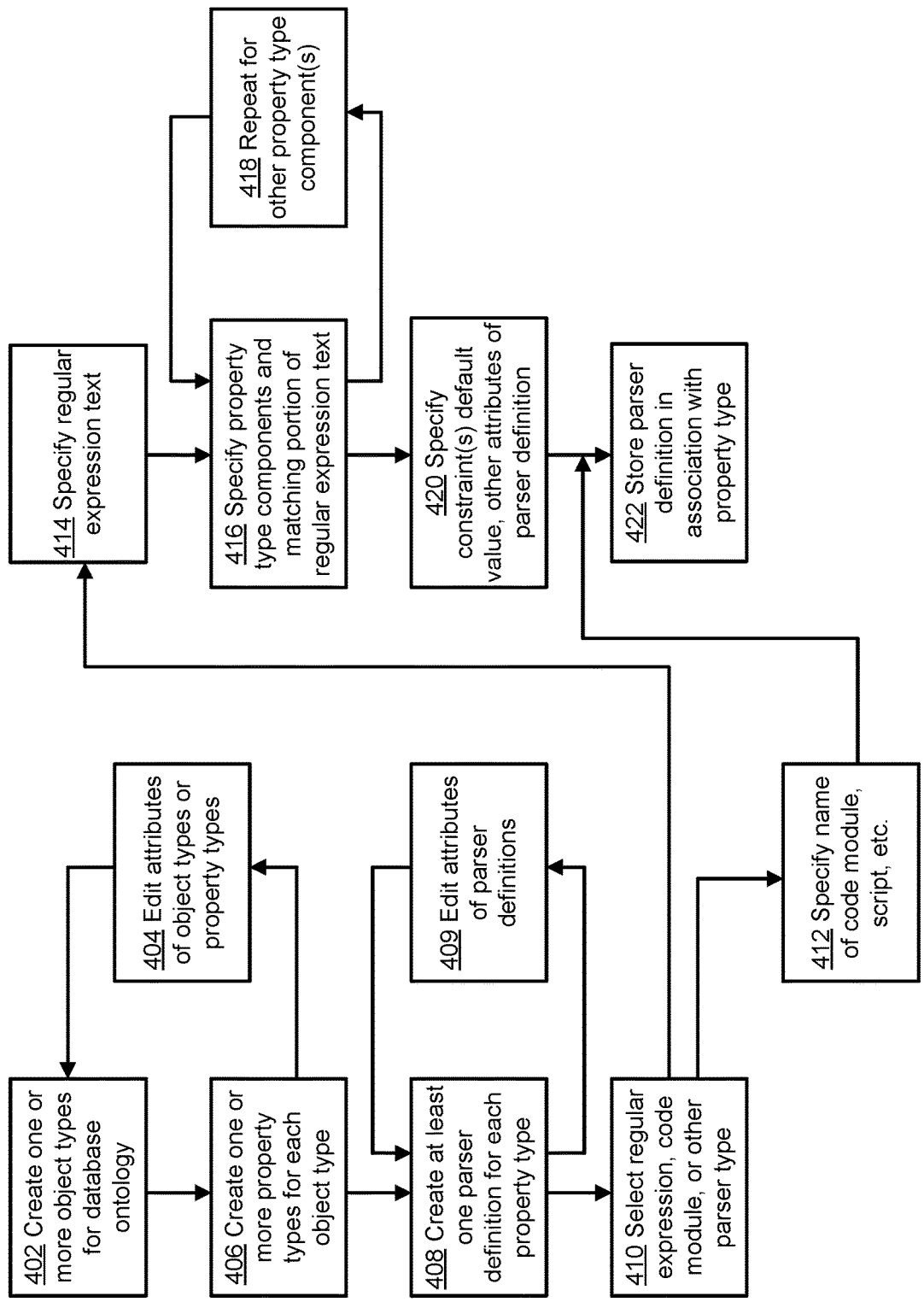
FIG. 4 illustrates defining a dynamic ontology for use in creating data in a data store.

FIG. 4 illustrates defining a dynamic ontology for use in creating data in a database. For purposes of disclosing a clear example, operations that may be used to define a dynamic ontology are illustrated in blocks 402-409 of FIG. 4, and are first described at a high level, and details of an example implementation follow the high level description. Although the operations may be referred to herein as "steps," (e.g., steps 402, 404, 406, etc.), unless indicated otherwise, these operations may be performed multiple time, for example, as loops as illustrated in FIG. 4. Also, in an embodiment, these operations may be performed in a different order, and/or there may be fewer operations or less operations.

In step 402, one or more object types are created for a database ontology. In step 406, one or more property types are created for each object type. As indicated in step 404, the attributes of object types or property types of the ontology may be edited or modified at any time.

In step 408, at least one parser definition is created for each property type. At step 409, attributes of a parser definition may be edited or modified at any time.

In an embodiment, each property type is declared to be representative of one or more object types. A property type is representative of an object type when the property type is intuitively associated with the object type. For example, a property type of "Social Security Number" may be representative of an object type "Person" but not representative of an object type "Business."

In an embodiment, each property type has one or more components and a base type. In an embodiment, a property type may comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is a Name property having a Last Name component and a First Name component. An example of raw input data is "Smith, Jane". An example parser definition specifies an association of input data to object property components as follows: {LAST_NAME}, {FIRST_NAME}→Name:Last, Name: First. In an embodiment, the association {LAST_NAME}, {FIRST_NAME} is defined in a parser definition using regular expression symbology. The association {LAST_NAME}, {FIRST_NAME} indicates that a last name string followed by a first name string comprises valid input data for a property of type Name. In contrast, input data of "Smith Jane" would not be valid for the specified parser definition, but a user could create a second parser definition that does match input data of "Smith Jane". The definition Name:Last, Name:First specifies that matching input data values map to components named "Last" and "First" of the Name property.

As a result, parsing the input data using the parser definition results in assigning the value "Smith" to the Name:Last component of the Name property, and the value "Jane" to the Name:First component of the Name property.

In an embodiment, administrative users use an administrative editor to create or edit object types and property types. In an embodiment, users use the administrative editor to specify parser definitions and to associate regular expressions, code modules or scripts with the parser definitions. In the administrative editor, a user can specify attributes and components of a property type. For example, in one embodiment a user specifies a graphical user interface icon that is associated with the property type and displayed in a user interface for selecting the property type. The user further specifies a parser definition that is associated with the property type and that can parse input data and map the input data to properties corresponding to the property type. The user further specifies a display format for the property type indicating how users will see properties of that property type.

In an embodiment, an object type editor panel could comprise graphical buttons for selecting add, delete, and edit functions, and one or more rows that identify object types and a summary of selected attributes of the object types. Example selected attributes that can be displayed in object editor panel include an object type name (e.g., Business, Asset, etc.), a uniform resource identifier (URI) specifying a location of information defining the object type (for example, "com. business_entity_name.object.business"), and a base type of the object type, also expressed in URI format (for example, "com. business_entity_name.object.entity"). Each URI also may include a graphical icon.

In an embodiment, a user interacts with a computer to perform the following steps to define an object type. Assume for purposes of an example that the new object type is Batch. Using the object type editor, the user selects the "Add Object Type" button and the computer generates and displays a panel that prompts the user to enter values for a new object type. The user selects a base object type of Entity, which may comprise any person, place or thing. The user assigns a graphical icon to the Batch object type. The user assigns a display name of "Batch" to the object type.

In an embodiment, a user interacts with the computer to define a property type in a similar manner. For example, the user specifies a name for the property type, a display name, and an icon. The user may specify one or more validators for a property type. Each validator may comprise a regular expression that input data modified by a parser must match to constitute valid data for that property type. In an embodiment, each validator is applied to input data before a process can store the modified input data in an object property of the associated property type. Validators are applied after parsing and before input data is allowed to be stored in an object property.

In various embodiments, validators may comprise regular expressions, a set of fixed values, or a code module. For example, a property type that is a number may have a validator comprising a regular expression that matches digits 0 to 9. As another example, a property type that is a US state may have a validator that comprises the set {AK, AL, CA . . . VA} of valid two-letter postal abbreviations for states. Validator sets may be extendible to allow a user to add further values. A property type may have component elements, and each component element may have a different validator. For example, a property type of "Address" may comprise as components "City", "State", and "ZIP", each of which may have a different validator.

In an embodiment, defining a property type includes identifying one or more associated words for the property type. The associated words support search functions in large database systems. For example, a property type of "Address" may have an associated word of "home" so that a search in the system for "home" properties will yield "Address" as one result.

In an embodiment, defining a property type includes identifying a display formatter for the property type. A display formatter specifies how to print or display a property type value.

In an embodiment, the parser definitions each include a regular expression that matches valid input, and the parser uses a regular expression processing module. For example, conventional Java language processors typically have regular expression processing modules built in. In an embodiment, parser definitions comprising regular expressions may be chained together. In another embodiment, one or more of the parser definitions each include a code module that contains logic for parsing input data and determining whether the input data matches a specified syntax or data model. The code module may be written in Java, JavaScript, or any other suitable source language.

In an embodiment, there may be any number of parser definitions and sub-definitions. The number of parser definitions is unimportant because the input data is applied successively to each parser definition until a match occurs. When a match occurs, the input data is mapped using the parser sub definitions to one or more components of an instance of an object property. As a result, input data can vary syntactically from a desired syntax but correct data values are mapped into correct object property values in a database.

Accordingly, referring again to FIG. 4, creating a parser definition for a property type at step 408 may comprise selecting a parser type such as a regular expression, code module, or other parser type. When the parser type is "code module," then a user specifies the name of a particular code module, script, or other functional element that can perform parsing for the associated property type.

In an embodiment, defining a property type includes creating a definition of a parser for the property type using a parser editor. In an embodiment, a screen display comprises a Parser Type combo box that can receive a user selection of a parser type, such as "Regular Expression" or "Code Module." A screen display may further comprises a Name text entry box that can receive a user-specified name for the parser definition.

When the parser type is "regular expression," steps 414-420 are performed. At step 414, regular expression text is specified. For example, when the Parser Type value of combo box is "Regular Expression," a screen display comprises an Expression Pattern text box that can receive a user entry of regular expression pattern text.

In step 416, a property type component and a matching sub-definition of regular expression text is specified. For example, a screen display further comprises one or more property type component mappings. Each property type component mapping associates a sub-definition of the regular expression pattern text with the property type component that is shown in a combo box. A user specifies a property type component by selecting a property type component using a combo box for an associated sub-definition. As shown in step 518, specifying a property type component and sub-definition of regular expression text may be repeated for all other property type components of a particular property type.

In step 420, a user may specify one or more constraints, default values, and/or other attributes of a parser definition.

The user also may specify that a match to a particular property type component is not required by checking a "Not Required" check box. A screen display may further comprise a Default Value text box that can receive user input for a default value for the property type component. If a Default Value is specified, then the associated property type receives that value if no match occurs for associated grouping of the regular expression. In alternative embodiments, other constraints may be specified.

At step 422, the parser definition is stored in association with a property type. For example, selecting the SAVE button causes storing a parser definition based on the values entered in screen display. Parser definitions may be stored in database 209.

The approach of FIG. 4 may be implemented using other mechanisms for creating and specifying the values and elements identified in FIG. 4, and a particular GUI of is not required.

Advantageously, use of a dynamic ontology may allow a user to take advantage of an ontological data model, while not constraining himself or herself to a hard-coded ontology. Hard-coded ontologies can be overly simple (i.e., lacking detailed semantic properties, making classification difficult but limiting analysis) or overly complex (i.e., having overly detailed semantic properties, making classification difficult). Use of a dynamic ontology can allow a user to define the desired level of semantic granularity, making dynamic ontologies suitable for a plurality of different and diverse uses (e.g., fraud prevention, cyber security, governmental applications, capital markets, etc.).

Advantageously, use of a parser or other ontology configuration tools may allow greater scalability of a user's database without loss of any analytic ability. Use of a parser or other ontology configuration tools and parser definitions, (e.g., first name, last name, etc.), may allow for self-categorization without the need for manual coding. Manual coding of a data object's properties may be subject to many of the disadvantages associated with manual data entry (e.g., slow, inaccurate, and costly). Additionally, manual coding of a data object's properties may not allow for dynamic ontology reconfiguration if a user chose to adjust the granularity, (i.e., specificity), or an ontologies semantic properties.

Figure 5:
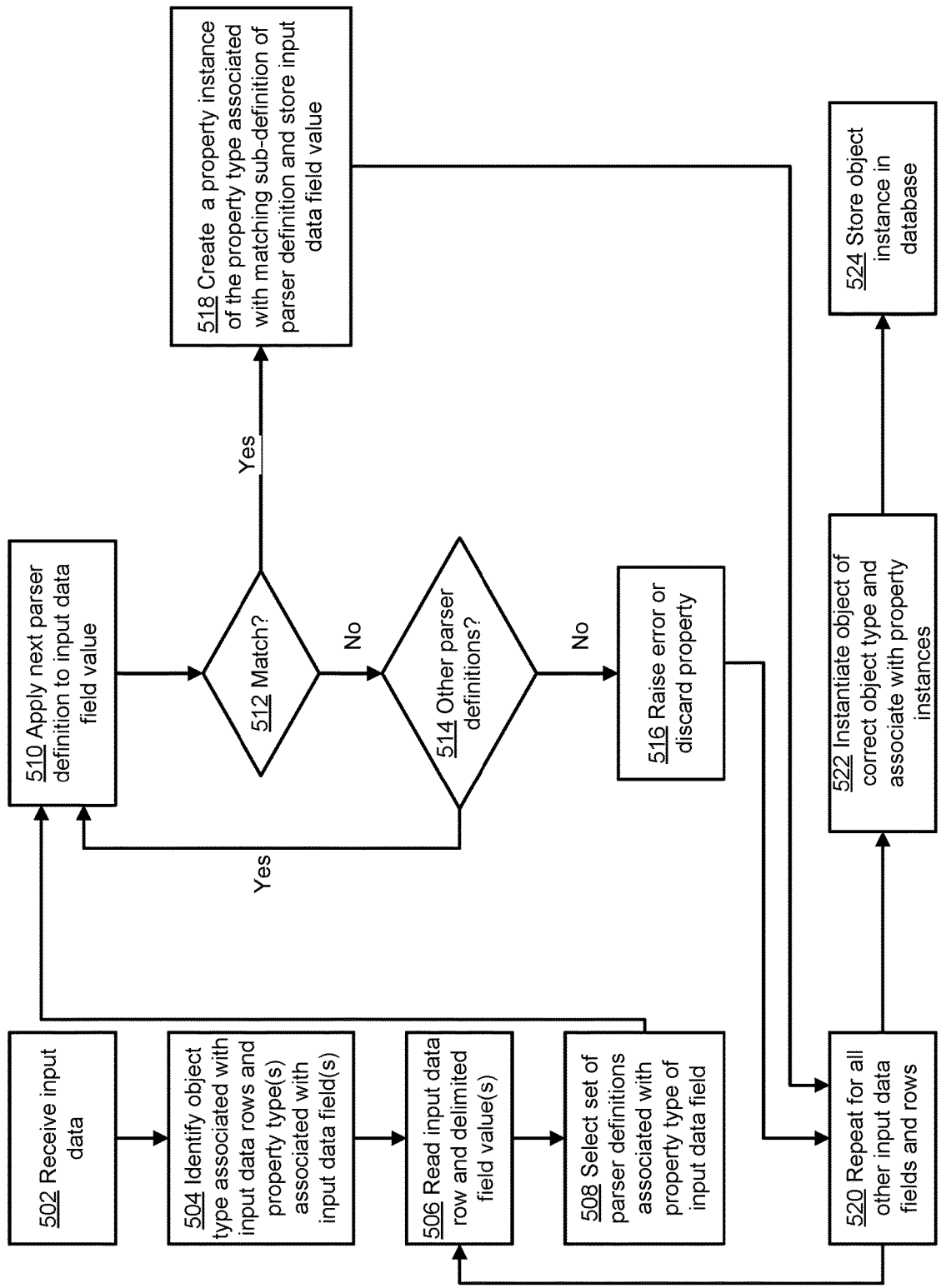
FIG. 5 illustrates a method of transforming data and creating the data in a database using a dynamic ontology.

FIG. 5 illustrates a method of transforming data and creating the data in a database using a dynamic ontology. For purposes of illustrating a clear example, the approach of FIG. 5 is described herein with reference to FIG. 3. However, the approach of FIG. 5 may be implemented using other mechanisms for performing the functional steps of FIG. 5, and the particular system of FIG. 3 is not required.

In step 502, input data is received. In an embodiment, an input data file is received. The input data file may comprise a comma-separated value (CSV) file, a spreadsheet, XML or other input data file format. Input data 300 of FIG. 3 may represent such file formats or any other form of input data.

In step 504, an object type associated with input data rows of the input data is identified, and one or more property types associated with input data fields of the input data are identified. For example, the object-property mapping 301 of FIG. 3 specifies that input data 300 comprises rows corresponding to object type PERSON and fields corresponding to property type components LAST_NAME, FIRST_NAME of property type NAME. The object-property mapping 301 may be integrated into input data 300 or may be stored as metadata in association with a data input tool.

In step 506, a row of data is read from the input data, and one or more field values are identified based on delimiters or other field identifiers in the input data.

In step 508, a set of parser definitions associated with the property type of a particular input data field is selected. For example, metadata stored as part of creating a property type specifies a set of parser definitions, as previously described.

In step 510, the next parser definition is applied to an input data field value. Thus, data fields are read from each row of the file and matched to each parser that has been defined for the corresponding property types. For example, assume that the mapping indicates that an input data CSV file comprises (Last Name, First Name) values for Name properties of Person objects. Data fields are read from the input data CSV file and compared to each of the parsers that has been defined for the Name property type given the First Name field and Last Name field. If a match occurs for a (Last Name, First Name) pair value to any of the parsers for the Name property type, then the parser transforms the input data pair of (Last Name, First Name) into modified input data to be stored in an instantiation of a Name property.

If applying a definition at step 510 results in a match to the input data, as tested at step 512, then at step 518 a property instance is created, and the input data field value is stored in a property of the property type associated with the matching sub-definition of the parser definition. For example, assume that the input data matches the regular expression for an ADDRESS value. The mapping specifies how to store the data matching each grouping of the regular expression into a component of the ADDRESS property. In response, an instance of an ADDRESS property is created in computer memory and the matching modified input data value is stored in each component of the property instance.

If no match occurs at step 512, then control transfers to step 514 to test whether other parser definitions match the same input data value. As an example, a property editing wizard in which multiple parsers have been created for a particular property, and through the loop shown in FIG. 5, each of the multiple parsers can be used in matching input data. If no match occurs to the given parser definition, then any other parser definitions for that property type are matched until either no match occurs, or no other parser definitions are available.

If a grouping is empty, then the component is filled by the default value for that component, if it exists. If no other parser definitions are available, then control transfers from step 514 to step 516, at which point an error is raised or the property is discarded.

At step 520, the preceding steps are repeated for all other values and rows in the input data until the process has transformed all the input data into properties in memory.

At step 522, an object of the correct object type is instantiated. For example, the object-property mapping 301 may specify an object type for particular input data, and that type of object is instantiated. The newly created object is associated in memory with the properties that are already in memory. The resulting object is stored in the database in step 524.

Steps in the preceding process may be organized in a pipeline. Using the approaches herein, a user can self-define a database ontology and use automated, machine-based techniques to transform input data according to user-defined parsers and store the transformed data in the database according to the ontology. The approach provides efficient movement of data into a database according to an ontology. The input data has improved intelligibility after transformation because the data is stored in a canonical ontology. Further, the approach is flexible and adaptable, because the user can modify the ontology at any time and is not tied to a fixed ontology. The user also can define multiple parsers to result in semantic matches to input data even when the syntax of the input data is variable.

In various implementations, data objects in ontology 205 stored in database 209, may be stored as graphs or graph-like relationships (which may comprise data structures or databases), referred to collectively as "graphs." Some examples of graphs include an undirected graph, clusters, and adjacency lists that allow storing of graphs in memory efficiently, particularly where the graphs are lightly-connected graphs or clusters (e.g. graphs or clusters wherein the number of nodes is high compared to the number of linkages per node). Adjacency matrices may also allow for more efficient access and processing, particularly vectorized access and processing (e.g. using specialized hardware or processor instructions for matrix math), to the graph or cluster data because each matrix row corresponding to a node may have the same size irrespective of the number of linkages by node. As described here, various data items may be stored, processed, analyzed, etc. via graph-related data structures, which may provide various storage and processing efficiency advantages described. For example, advantages of graph-related data structures may include: built to handle high volume, highly connected data; efficient in computing relationship queries than traditional databases, either using adjacency matrices, or adjacency lists; can easily add to the existing structure without endangering current functionality; structure and schema of a graph model can easily flex; new data types and its relationship; evolves in step with the rest of the application and any changing business data requirements; can easily add weights to edges; can use optimal amount of computer memory, etc.

The nodes of a graph may represent different information or data objects, for example. The edges of the graph may represent relationships between the nodes. The ontology may be created or updated in various ways, including those described herein, comprising both manual and automatic processes. In some implementations, the ontology and or data objects in the graph database may be created and/or interacted with visually through various graphical user interfaces. Advantageously, this allows the user to interact with the data objects by placing, dragging, linking and deleting visual entities on a graphical user interface. The ontology may be converted to a low-level (i.e. node list) representation.

Figure 6A:
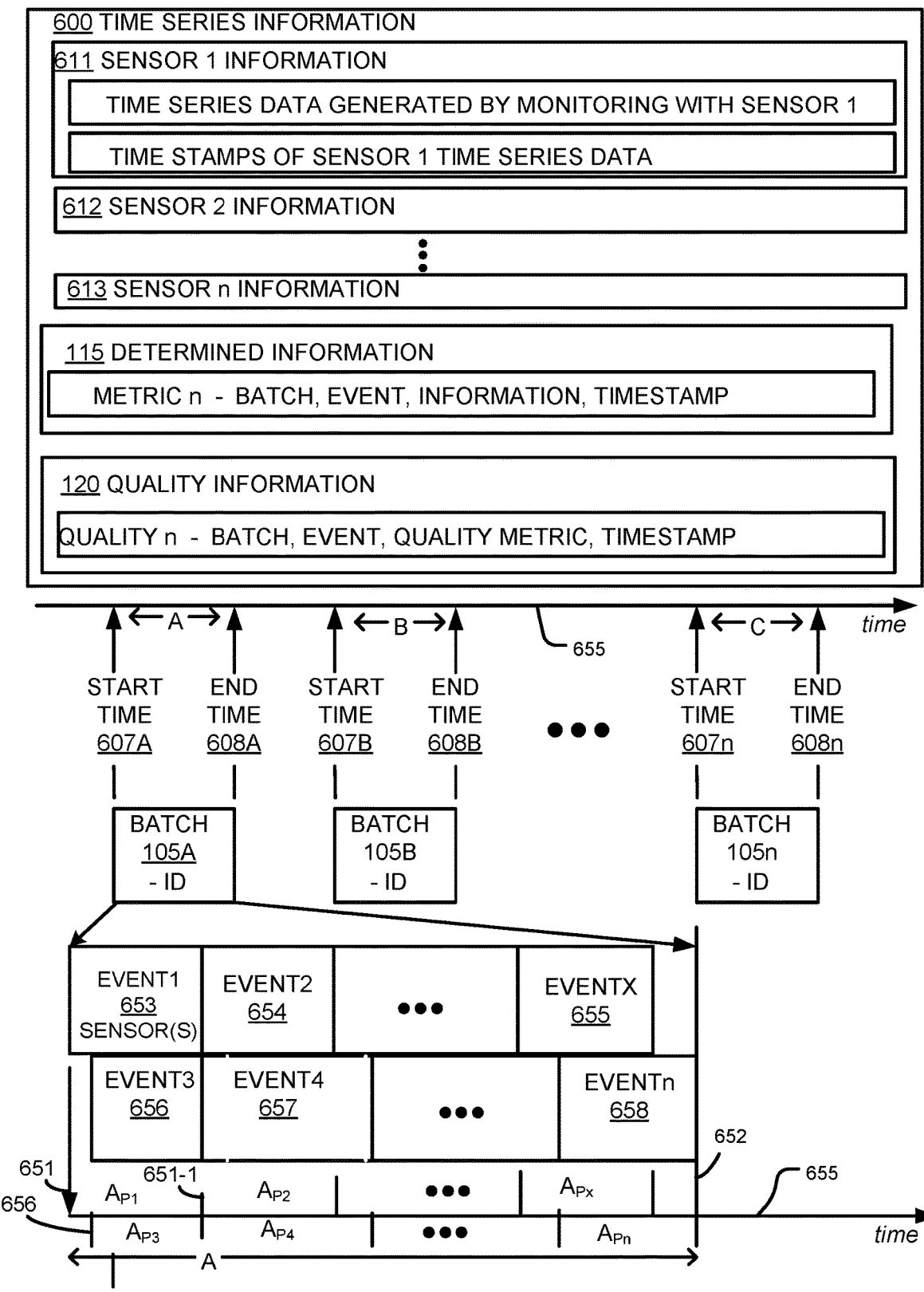
FIG. 6A illustrates time relationships between time series information, batches of a process, and one or more phases that may be included in each of the batches of a process.
Figure 6B:
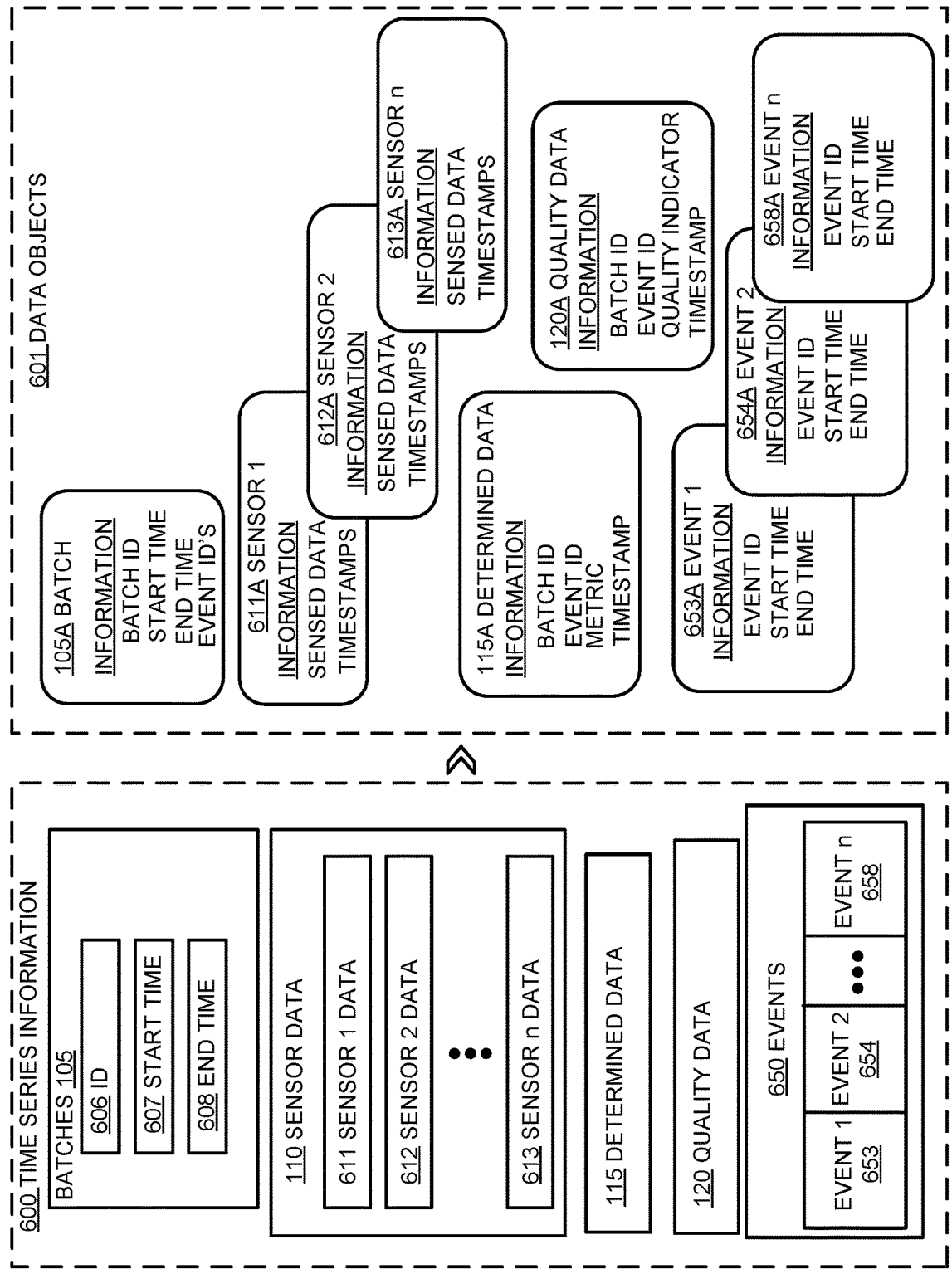
FIG. 6B illustrates an example of time series information and corresponding data objects of a data store using a dynamic ontology.

FIG. 6A and FIG. 6B are discussed together below, and sometime referred to collectively as FIG. 6. FIG. 6A illustrates an example of aspects of time series data and data objects that store the time series data. FIG. 6B illustrates an example of time series information 600 and corresponding examples of data objects 601 of a data store using an ontology.

In this example, the time series information 600 relates to one or more batches 105, sensor data 110 which includes data from multiple sensors, determined data (or information) 115, quality data 120, and events 653, 654, 655, 656, 657, and 658. The batches 105 include a batch identifier 606, a start time 607, and an end time 608. As illustrated in FIG. 6A, time series data is collected for batch 105A for a duration of time A between the start time 607A and the end time 608A. Similarly, time series data is collected for batch 105B for a duration of time B, and time series data is collected for batch 105C for a duration of time C. The various batches 105 may be associated with (e.g., processed by) one system, or multiple systems. In other words, each of batches 105 may be associated with the same system as the other batches, or the batches may be associated with two or more different systems. The sensor data 110 includes time series data collected by a plurality of sensors that monitor the batches 105. The sensors collecting the sensor data for each batch may be the same sensors or different sensors. If the batches 105 are associated with multiple (different) systems, the sensor data 110 represents the time series data collected by the plurality of sensors on each of the multiple different systems.

As discussed in reference to FIG. 1, the determined data 115 is time series data that includes information relating to the batches 105 that may be determined from multiple sources are inputs. For example, the determined data 115 may be determined by inputs from a user and or inputs from one or more sensors, or another source of information.

Quality data 120 is information relating to a quality characteristic of a batch that a user may input as a batch undergoes several events. A user may determine a quality characteristic of a batch by one of their senses (for example, sight, sound, touch, taste, and smell). For example, in an embodiment of a batch where ingredients are processed to form a cake, during a mixing event (and at a certain instance in time) a user may determine a consistency quality of the mix to be thin, smooth or coarse. In a later event (and at a certain instance in time) when the ingredients are being heated in an oven, a user may determine by site or touch the quality aspect that at a certain point in time the cake has been sufficiently baked. Once the cake is removed from the oven, a user may determine, by taste, a quality aspect of how well the cake tastes at a certain instance in time. Additionally or alternatively, the quality data 120 can include data that is generated by a system or machine.

FIG. 6 also illustrates an example of events 650 that includes multiple events 653, 654, . . . 658 that may occur during each of batches 105A, 105B, 105n. Batch 105A has a start time of 607A and an end time of 608A. Batch 105B, as a start time of 607B and an end time of 608B. And batch 105n has a start time of 607n and an end time of 608n. The events occur on a system for a specific batch, and they may occur in all similar batches. As illustrated in FIG. 6A, batch 105A includes "Event 1" 653, "Event 2" 654, "Event X" 655, "Event 3" 656, "Event 4" 657, and "Event n" 658. All of the events associated with a batch do not necessarily occur serially. Instead, events associated with a batch can start and stop at different times during the batch. Each grouping of events can be associated with a particular sensor. The duration of events may be different and when multiple events are happening at the same time the start and stop time of the events may or may not be aligned. An example of this is as illustrated by "Event 1" 653 having a start time of 651 (that is temporally aligned with the batch 105A start time 607A) and an end time of 651-1, thus event1 653 occurs for the time period $A_{p1}$. "Event 3" 656 occurs during a portion of the time event1 653 occurs, "Event 3" having a start time of 656 and an end time of 651-1 and thus occurring during the time period $A_{p3}$. "Event 2" 654 occurs during the time period $A_{p2}$, and "Event 4" 657 occurs during the time period $A_{p4}$, which partially overlaps the occurrence of "Event 2" 654. "Event n" 658 occurs during the time period $A_{pn}$ and is the last event associated with batch 105A, and has an end time at 652 that corresponds to the end time 608A of batch 105A. As mentioned above, while not illustrated, separate groupings of events for a particular batch can have the same start and/or end times.

In some examples, the events relate to a portion of a system that is monitoring a batch during a particular time. In one example, where the batch is a vehicle moving to a particular route, an event may be a particular part of the route, as defined by specific geographic area, or by a split specific time. Also, if the batch is a vehicle, an event may relate to a certain portion of the vehicle thus defining one or more sensors that may be located in the certain portion of the vehicle to capture time series data relating to the event. For example, the event may be a braking operation of the vehicle and sensors monitor characteristics of the braking operation for example heat, pressure, rotational speed, movement of braking mechanisms, noise, etc. also if the event is a braking operation of a vehicle, the event may take place in more than one location of the vehicle. In other words during the braking operation event sensor data may be collected from multiple locations on the vehicle, for example, at each wheel and at control components for the braking operation. Similarly, if the batch is a cake and during the baking process the cake is baked in a first oven for a particular time and a second oven for particular time, two events for this batch may be the places the cake is located during baking, that is, the first oven and the second oven.

FIG. 6B also illustrates an example of data objects 601 that relate to time series information 600. The data objects 601 may be defined by an ontology 205 to store information related to a batch, including time series data generated by one or more sensors that monitor the batch, as described in reference to FIGS. 2-5. Data objects may store information for the batches 105, sensor data 110, determined data 115, quality data 120, and events 625. In various examples, such data objects may be defined in various ways, and FIG. 6 illustrates one example of such data objects 601. In some embodiments, a user interface for the data model can enable a user to configure the data objects 601, such as by defining batch types, sensor types, other object information, and/or relationships between the data objects, such as links between the data objects.

In this example, data objects 601 includes for each batch a data object batch 105A, which includes information relating to a particular batch. In this example data object batch 105S includes a batch identifier, the start time, and end time, and one or more event identifiers indicating particular events that are associated with batch 105A. That is, the event identifiers are the events that a batch experiences while is being monitored. Data objects 601 also includes a data object for each sensor related to a batch. In this example, such data objects include data object sensor 1 611A, data object sensor 2 612A, and data object sensor n 613A. Each of the sensor data objects 611A, 612A, 613A includes information relating to the sensor. In this example, each of sensor data objects 611A, 612A, 613A includes sensed data (data samples) and a timestamp indicating when the sensed data was captured. That is, each data sample has a corresponding timestamp, such as a timestamp for each data value.

Data objects 601 also includes a data object determined data 115A which includes a batch identifier, an event identifier, the determined data metric or information, and the timestamp indicating the time associated with the determined data. Data objects 601 also includes a data object quality data 120A, which includes a batch identifier, an event identifier, quality indicator, and a timestamp. Data objects 601 further includes data object events 653A, 654A, in 658A. Each of the data object events 653A, 654A, in 658A, includes an event identifier a start time and an end time. In some embodiments, the data objects 601 do not include the data object quality data 120A.

By defining data objects to have certain links and properties is described in reference to FIG. 2, and adding information to these data objects and defining links and properties of these data objects as described in FIGS. 3, 4, and 5, the time series information 600 associated with multiple batches that are each monitored by multiple sensors during multiple events can be organized and stored for later use. A user interface, such as a time series user interface, can then use these data objects to quickly and efficiently access specific portions of the time series data and plot the data for display on a user interface. For example, the data objects 601 can be used to determine from time series data of a first sensor, a first subset of time series data for a first batch from a desired first start time to a first end time. The data objects 601 can also be used to determine, from time series data of the first sensor, a second subset of time series data for the second batch from a second start time to a second end time. This determined data can then be used to generate a time series user interface comprising a chart, the chart comprising a first plot for the first subset of time series data and a second plot for the second subset of time series data, wherein the first plot is aligned to the second plot such that the data can be compared, and the generated user interface can be displayed and/or the time-aligned data provided to an analysis system for identifying and/or alerting users through the user interface of a particular condition, such as a fault.

Using data objects 601 that are stored on a computer storage medium, many different time series user interfaces may be generated, each of the time series user interfaces comprising a different chart illustrating plots of different portions of the time series data. For example, portions of time series data relating to one or more of various sensors, various batches, various events, various determined information, and/or various quality data.

Figure 7:
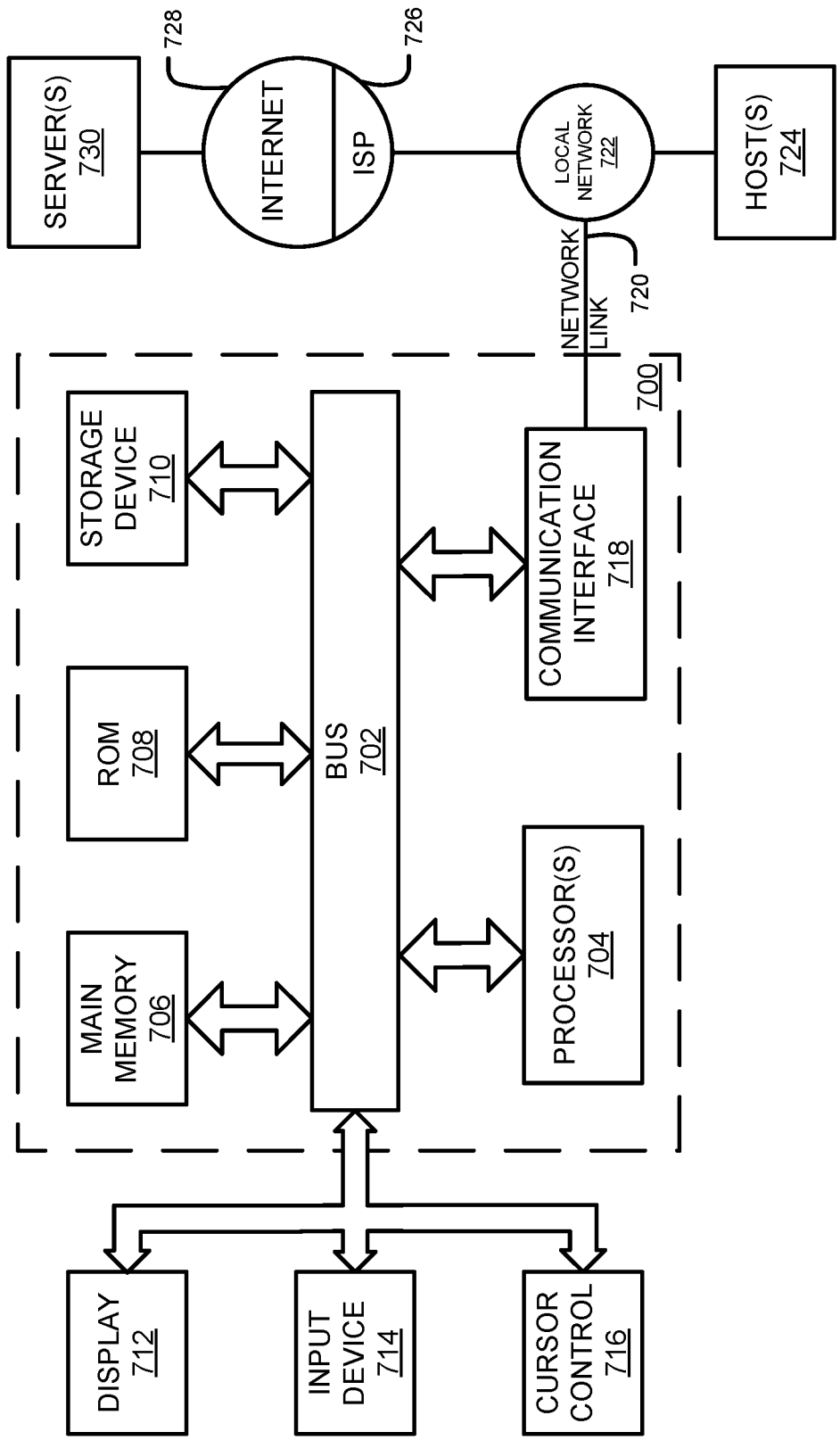
FIG. 7 illustrates a computer system with which certain methods discussed herein may be implemented.

FIG. 7 is a block diagram that illustrates a computer system 700 upon which various embodiments may be implemented. Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors.

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions. The main memory 706 may, for example, include instructions to allow a user to manipulate time series data to store the time series data in data objects as defined by an ontology, as described in reference to FIGS. 2-5.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

Various forms of computer readable storage media may be involved in carrying one or more sequences of one or more computer readable program instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicate with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution.

Accordingly, in some embodiments, of the computer system 700, the computer system comprises a first non-transitory computer storage medium storage device 710 configured to at least store for a plurality of batches, (i) first time series object data comprising a first start time and a first end time for a first batch, and (ii) second time series object data comprising a second start time and a second end time for a second batch. The computer system 700 can further comprise a second non-transitory computer storage medium main memory 706 configured to at least store computer-executable instructions. The computer system can further comprise one or more computer hardware processors 704 in communication with the second non-transitory computer storage medium main memory 706, the one or more computer hardware processors 704 configured to execute the computer-executable instructions to at least: determine, from time series data from a first sensor, a first subset of time series data for the first batch from the first start time and the first end time; determine, from the time series data from the first sensor, a second subset of time series data for the second batch from the second start time and the second end time; generate a time series user interface comprising a chart, the chart comprising a first plot for at least a portion of the first subset of time series data and a second plot for at least a portion of the second subset of time series data, wherein the first plot is temporally aligned to the second plot; and cause presentation of the time series user interface on the display 712. The plots may be temporally aligned, for example, such that they are graphically aligned. Either the first plot or the second plot may be shown in the chart as shifted in time so that they may begin at a same relative time in the chart. For example, the temporal alignment of the first plot to the second plot may align the portion of the first subset of time series data with the portion of the second subset of time series data in the chart in a vertical or horizontal corresponding direction such that points of the first plot and the second plot along the corresponding direction represent the same point in time relative to the start of the respective first batch and second batch.

The computer system 700 can include many other aspects. In an embodiment, the one or more computer hardware processors 704 of the computer system 700 are further configured to execute the computer-executable instructions to receive and store user input plot display range data for at least one of the first plot and the second plot, and in response to receiving the user data, from user input device 714, generate a time series user interface including a chart using the user input plot display range data, the chart including a first plot for the first subset of time series data and a second plot for the second subset of time series data, wherein the first plot is aligned to the second plot, wherein the user input display range data indicates a period of time. In another example, the one or more computer hardware processors 704 of the computer system 700 are further configured to execute the computer-executable instructions to determine, from time series data from a plurality of sensors, a corresponding number of one or more additional subsets of time series data for the first batch from the first start time and the first end time of the first batch, determine, from the time series data from the plurality of sensors, a corresponding number of one or more additional subsets of time series data for the second batch from the second start time and the second end time of the second batch, and cause presentation of the time series user interface. The chart may further include one or more additional plots corresponding to the one or more additional subsets of time series data, wherein the one or more additional plots are also aligned and comparable to the first plot and the second plot. As described in reference to FIGS. 2-5, the one or more computer hardware processors 704 may be configured to execute the computer-executable instructions to generate a user interface for defining an object model to store the first time series object data and the second time series object data.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure. For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8A:
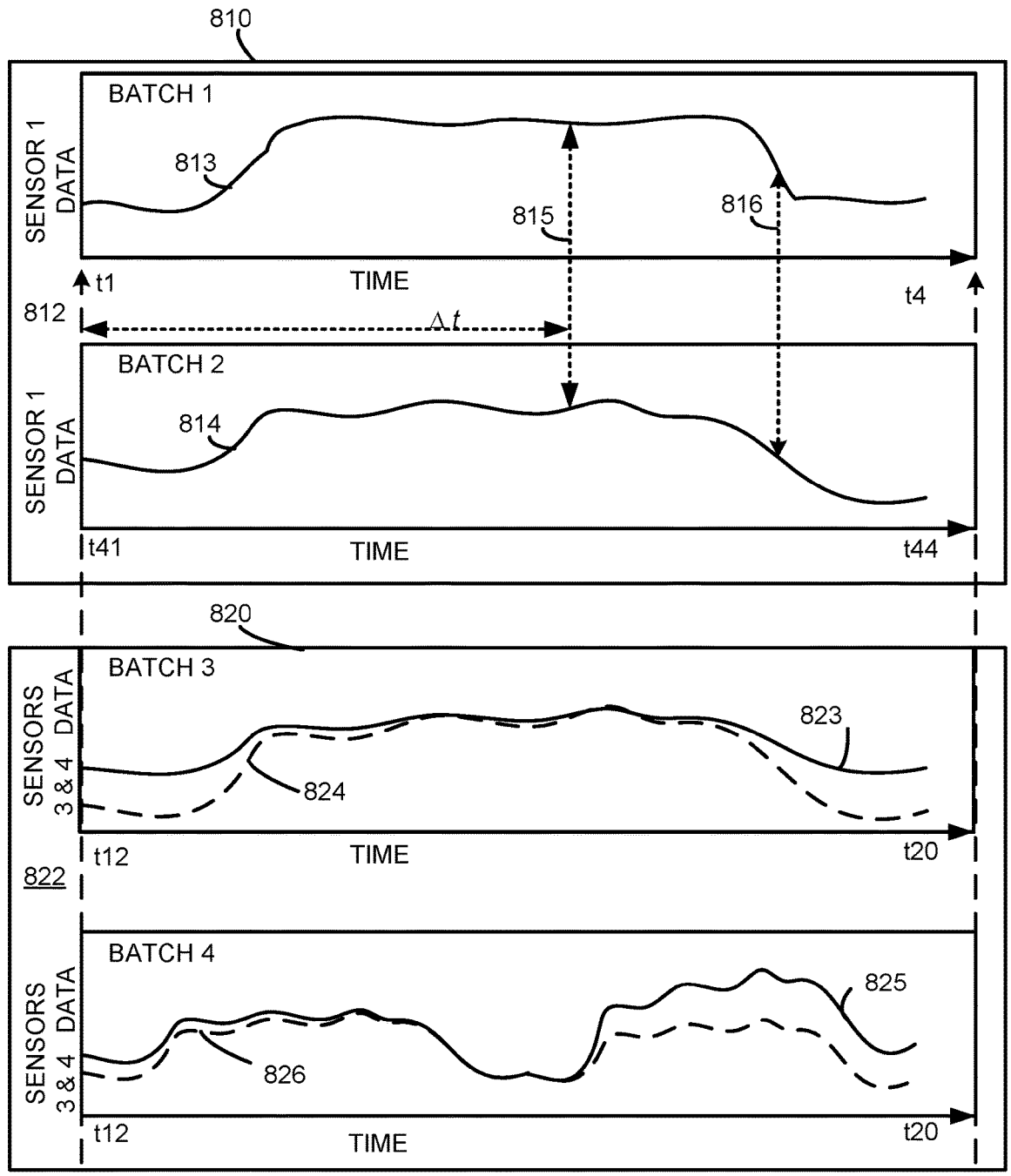
FIG. 8A is an example user interface that displays time series data from one or more sensors collected at different times, where the time series data has been temporally shifted such that it aligns with each other to be at the same instance of a process or event.

FIG. 8A illustrates two examples of displayed user interfaces that can display time series data associated with batches, the time series data organized and stored using an ontology as described herein. In one example, user interface 810 includes chart 812, which includes two plots 813, 814 of time series data. Plot 813 is a graphical representation of time series data of batch 1, collected by sensor 1 over a time period starting at time t1 and ending at time t4. Plot 814 is a graphical representation of time series data of batch 2, collected by sensor 1 over a time period starting at time t41 and ending at time t44. In this example, batch 1 and batch 2 were run on, and/or were monitored by, the same system such that sensor 1 collected time series data for both batch 1 and batch 2, but at different times (in this case, the sensor 1 data in plot 814 was collected subsequent to the sensor 1 data in plot 813). In this example, batch 1 had a start time at t1 and an end time at t30. Thus, the time period of plot 813 defined by t1 to t4 represents a subset of the duration of the total time of batch 1. Also in this example, batch 2 had a start time at t41 and an end time at t70 time. Thus, the time period of plot 814 defined by t40 to t44 represents a subset of the duration of the total time of batch 2.

Plot 813 and plot 814 are displayed in user interface 810 such that corresponding time instances in batch 1 and batch 2 are aligned for easy comparison. In other words, the time series data represented by plot 813 and plot 814 has been temporally adjusted such that instances in the timeline of each batch correspond in a vertical direction relative to the page. A corresponding data point on plot 813 and plot 814, as illustrated by the arrows of line 815, was collected by sensor 1 at the same relative time Δt in the batch 1 and batch 2 processing, that is, when compared to the start time of the batch. Similarly, the arrows of line 816 also indicate corresponding data points on plot 813 and 814. In this way time series sensor data generated by the same sensor in different batches may be displayed simultaneously such that the data is temporally aligned and comparable for ease of analysis of the time series sensor data.

While this example shows chart 810 as illustrating time series sensor data of plots of a single sensor for two different batches, the user interface can also be generated to show any portion (or subset) of collected time series data (for example time series data that includes sensor data, determine data, and/or quality data). Also, in various other examples, a user interface can be generated to have various types of plots that can include various combinations of the collected time series data, for example, any combination of time series data related to one or more different batches, one or more different sensors, for different processes and over different timeframes. In some examples, for ease of analysis, any time series data stored in the database for two or more batches can be displayed on the same plot. In some examples, a user can input an indication of a time range or period of time series data that they want to have displayed as the time scale in the one or more plots. In one example, to indicate the time for which the data is to be displayed, a user can enter a start time and an end time. In another example, the user can enter a start time and then a length of time after the starting time. In another example, a user can indicate an event associated with the batch and the time series data collected during the event or a portion of the event can be displayed.

FIG. 8A shows another example of a user interface 820 that can be generated that illustrates a chart 822 that includes a first plot for batch 3 showing time series sensor data 823 for sensor 3 and time series sensor data 824 for sensor 4. The plot for batch 3 represents a subset of the time series data collected for batch 3 and is shown here from time t12 to time t20. User interface 820 also illustrates in chart 822 a second plot for batch 4 showing time series sensor data 825 for sensor 3 and time series sensor data 826 for sensor 4. The plot for batch 4 represents a subset of the time series data collected for batch 3 and is shown here from time t12 to time t20. In this example, the time series data collected for batch 3 and batch 4 were collected on two different systems, for at least a portion of the same time. Also in this example the user interface 820 was also generated to have a time range for batch 3 from t12 to t20, and a different time range t12 to t20 for batch 4. Such a user interface can be used to compare aligned time series data from multiple sensors for batches associated with two different systems.

Figure 8B:
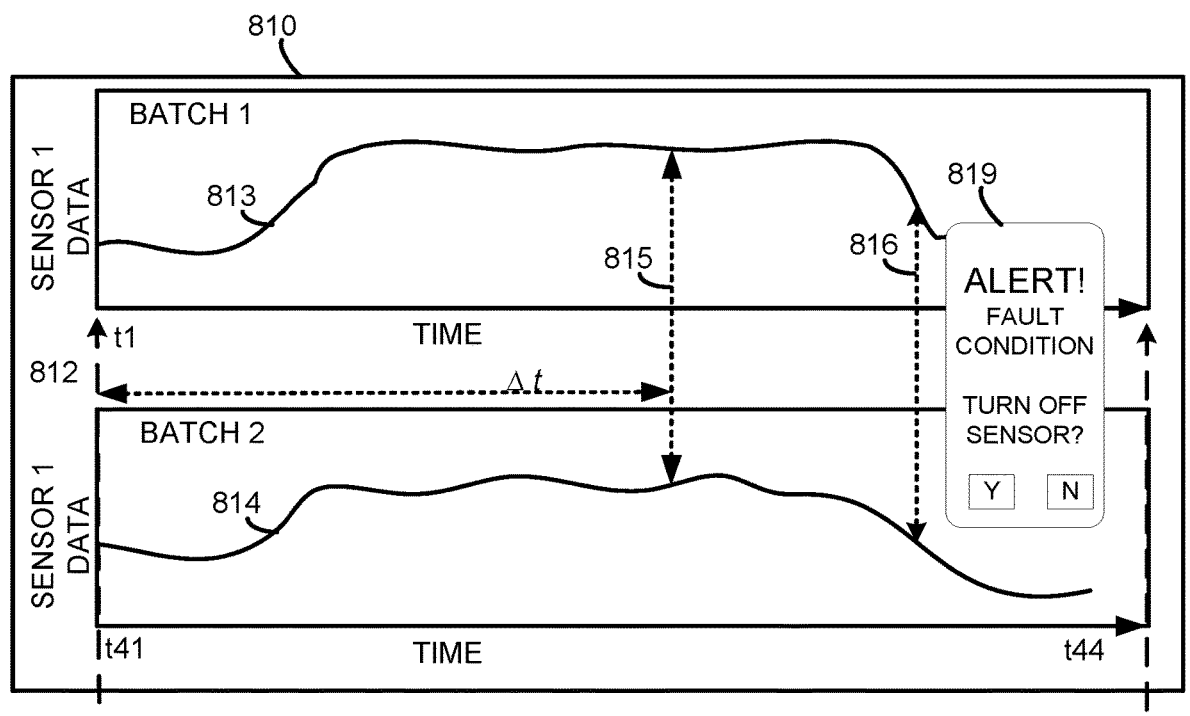
FIG. 8B is an example user interface that displays time series data from one or more sensors collected at different times, similar to FIG. 8A but indicating detection of a predetermined condition and issuing an alert on the user interface.

FIG. 8B shows another example of the user interface 810, similar to that shown in FIG. 8A, in which the analysis system identifies a variation between plots 813 and 814, at a time indicated by reference numeral 817, that meets a predetermined alert condition, e.g. because the variation between the plot values at a corresponding time is greater than a certain predetermined threshold. In response to this, a prompt 819 may be displayed alerting the user via the user interface 810 and enabling the user to turn-off the sensor, or in some cases, the underlying system, for example, during a subsequent operation of the system.

In various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Figure 9:
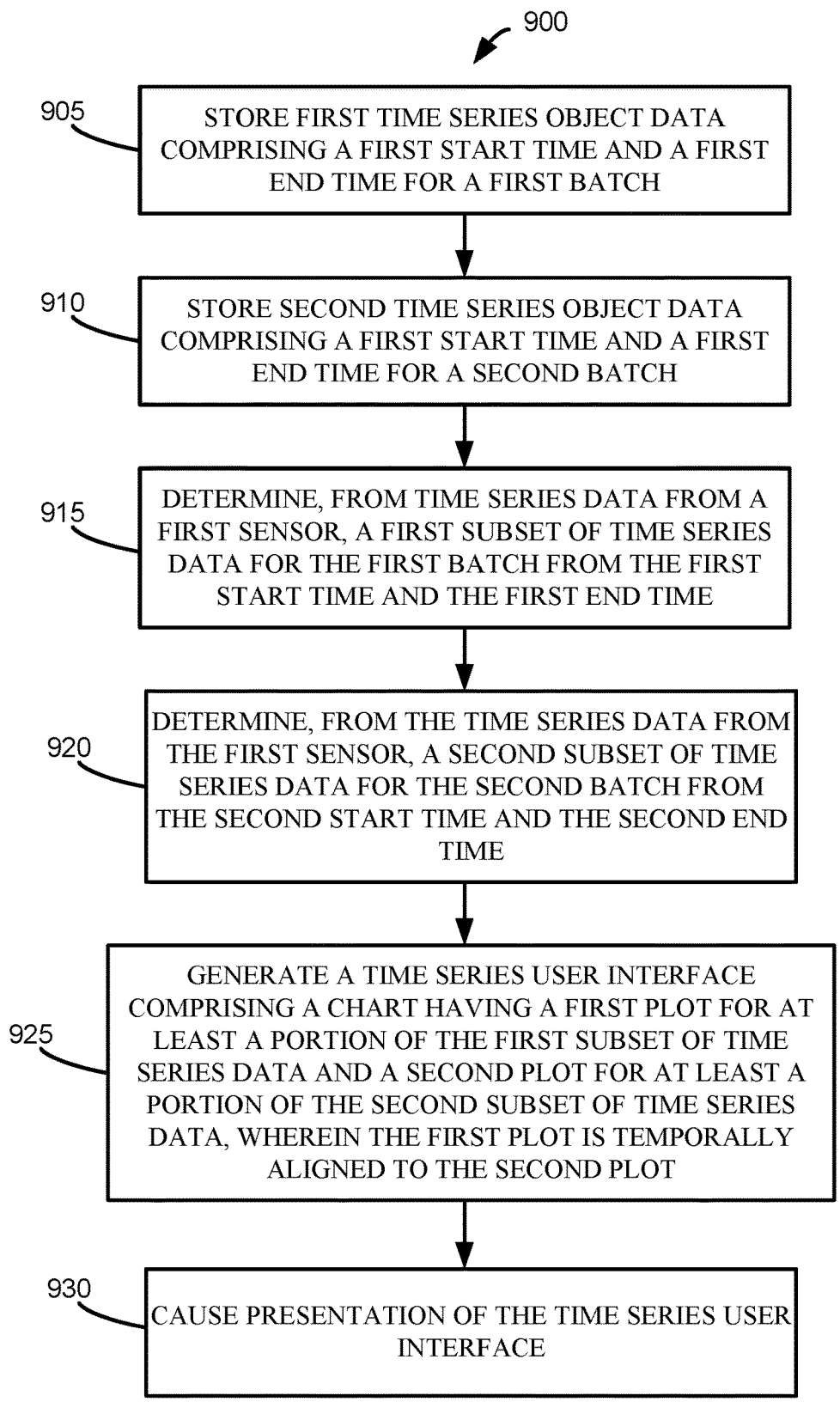
FIG. 9 is an example of a flowchart for presenting time series data in a user interface.

FIG. 9 is an example of a flowchart of a method 900 presenting time series data in a user interface. In an embodiment, method 900 can be performed using the computer system 700 described in reference to FIG. 7. At block 905, the method 900 stores first time series object data comprising a first start time and/or a first end time for a first batch. At block 910, the method 900 stores second time series object data comprising a second start time and/or a second end time for a second batch. The first time series object data and the second time series object may relate to any time series data that has been parsed and organized as defined by an ontology, as described herein, for example, in FIGS. 2 through 5.

At block 915, using one or more computer hardware processors in communication with a second non-transitory computer storage medium configured to at least store computer-executable instructions, the method 900 determines, from time series data from a first sensor, a first subset of time series data for the first batch from the first start time and the first end time. At block 920, using one or more computer hardware processors in communication with a second non-transitory computer storage medium configured to at least store computer-executable instructions, the method 900 determines, from the time series data from the first sensor, a second subset of time series data for the second batch from the second start time and the second end time. The first subset of time series data in the second subset of site time series data may relate to an event that occurs in both batch 1 and batch 2, for example as described in reference to FIGS. 6A and 6B.

At block 925, the method 900 generates a time series user interface comprising a chart, the chart comprising a first plot for at least a portion of the first subset of time series data and a second plot for at least a portion of the second subset of time series data, wherein the first plot is temporally aligned to the second plot. The temporal alignment of the first plot to the second plot aligns the portion of the first subset of time series data with the portion of the second subset of time series data in the chart in a vertical or horizontal corresponding direction such that points of the first plot and the second plot along the corresponding direction represent the same point in time relative to the start of the respective first batch and second batch.

Temporal alignment of first and second time series data can include using a time shift operation. In some embodiments, the time series user interface can query an application programming interface (API) to retrieve time series data from a data store; moreover, the API can include parameters to request data in a particular format. First time series data can be associated with a first batch and a first start and/or stop times. Second time series data can be associated with a second batch and a second start and/or stop times. The first and second time series data can be associated with same sensor. However, as described herein, the first and second start and stop times can be different, but it may advantageous for a user view the time series data for the first and second batches as temporally aligned for comparison purposes. Accordingly, a relative time axis can be shown in the user interface.

Temporal aligning time series can include requesting the first and second time series data for a period of time, which can be performed partially or entirely at blocks 905 and 910. In some embodiments, the period of time can be defined by the start and end time of a batch. In other embodiments, the period of time can be selected by a user. An example period of time can include 1 minute, 1 hour, 1 day, or 30 days, for example. Thus, the first time series data can be retrieved for the first batch using the start time for the first batch and the period of time; the second time series data can be retrieved for the second batch using the start time for the second batch and the period of time. Both the first and second time series data can be time shifted. In some embodiments, time shifting of the first and second time series data can be performed by the API for requesting time series data. Time shifting the first and second time series data can include updating the respective timestamp data in each of the series data by setting a first timestamp in the time series data to "zero," which allows presentation of the first and second time series on a relative time series axis. Setting a first timestamp to "zero" can include actually setting the timestamp to a zero timestamp value or to a particular common timestamp such as Jan. 1, 2017 12:00 AM or some other timestamp. The remaining timestamps in the time series data can be adjusted relative to the first timestamp in the time series data being set to zero. Setting the initial time series data values to zero for multiple sets of time series data can advantageously allow the time series user interface to allow operations such as combining two or more time series by addition, subtraction, multiplication, averaging, statistical operations, interpolation, or some other operation.

Finally, at block 930, method 900 causes presentation of the time series user interface. For example, the time series user interface may be presented on display 712 described in reference to FIG. 7. The first time series object data may include the time series data for the first sensor and time series data for at least one other sensor for the first batch. The second time series object data includes the time series data for the second sensor and time series data for at least one other sensor for the second batch.

The method 900 may also include receiving and storing user input plot display range data for at least one of the first plot and the second plot, where generating the time series user interface comprises, in response to receiving the user data, generating using the one or more computer hardware processors the time series user interface comprising the chart using the stored user input plot display range data.

The method 900 may also include using the one or more computer hardware processors, determining, from time series data from at least one additional sensor, at least a third subset of time series data for the first batch from the first start time and the first end time of the first batch, determining, from time series data from the at least one additional sensor, at least a fourth subset of time series data for the first batch from the first start time and the first end time of the first batch. The chart presented in the time series user interface includes additional plots corresponding to the at least one additional sensor, wherein the additional plots are also temporally aligned and temporally aligned to the first plot and the second plot.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

The invention claimed is:

1. A system comprising:
   one or more non-transitory computer storage mediums configured to store compute executable instructions; and
   one or more computer hardware processors in communication with the one or more non-transitory computer storage mediums configured to execute the computer-executable instructions to at least:
      determine from time series data of first information collected in reference to an instance of time, a first subset of time series data for a first batch;
      determine from the time series data of first information, a second subset of time series data for a second batch, the first batch and the second batch each associated with a different occurrence of the same event or process;
      generate a time series user interface comprising a chart, the chart comprising a first plot for at least a portion of the first subset of time series data and a second plot for at least a portion of the second subset of time series data, wherein the first plot is temporally aligned to the second plot at the same instance of the occurrence of the event or process to which the first batch and the second batch are respectively associated; and
      cause presentation of the time series user interface.

2. The system of claim 1, further comprising a first sensor, wherein the time series data of first information is generated by the first sensor.

3. The system of claim 1, wherein the time series data of first information is generated by a first sensor.

4. The system of claim 1, wherein the time series data of first information indicates the number of times an event occurred during a time period.

5. The system of claim 4, wherein the event is a computer operation.

6. The system of claim 4, wherein the event is generating an error log.

7. The system of claim 4, wherein the event is generating a message.

8. The system of claim 4, wherein the event is a query.

9. The system of claim 4, wherein the event is a communication.

10. The system of claim 1, wherein the time series data of first information is object data organized as defined by an ontology.

11. The system of claim 1, wherein the one or more computer hardware processors are further configured to execute the computer-executable instructions to receive and store input plot display range data for at least one of the first plot and the second plot, and in response to receiving the input plot display range data, generate the time series user interface, wherein the input display range data indicates a period of time for the first and second plot.

12. The system of claim 1, the one or more computer hardware processors further configured to execute the computer-executable instructions to generate the time series user interface such that a first start time of the first subset of time series data in the first plot and a second start time of the second subset of time series data in the second plot are graphically aligned in the chart.

13. The system of claim 1, the one or more computer hardware processors further configured to execute the computer-executable instructions to generate the time series user interface such that first plot and the second plot are aligned, having the first subset of time series data in the first plot and the second subset of time series data in the second plot shown in the chart as beginning at a same relative time.

14. The system of claim 1, wherein the one or more computer hardware processors are further configured to execute the computer-executable instructions to receive and store user input plot display range data for at least one of the first plot and the second plot, and in response to receiving the user data generate a time series user interface comprising a chart using the stored user input plot display range data, the chart comprising a first plot of a first portion of the first subset of time series data and a second plot of a second portion of the second subset of the second time series data, wherein the first plot is aligned to the second plot.

15. A method of presenting time series data in a user interface, the method comprising:
   determining from time series data of first information collected in reference to an instance of time, a first subset of time series data for a first batch;
   determining from the time series data of first information, a second subset of time series data for a second batch, the first batch and the second batch each associated with a different occurrence of the same event or process;
   generating a time series user interface comprising a chart, the chart comprising a first plot for at least a portion of the first subset of time series data and a second plot for at least a portion of the second subset of time series data, wherein the first plot is temporally aligned to the second plot at the same instance of the occurrence of the event or process to which the first batch and the second batch are respectively associated; and
   causing presentation of the time series user interface,
   wherein the method is performed by one or more computer hardware processors configured to execute computer-executable instructions stored on a non-transitory computer readable medium.

16. The method of claim 15, further comprising storing the first time series data of first information, wherein the first time series data of first information is organized as defined by an ontology.

17. The method of claim 15, wherein the time series data of first information indicates the number of times an event occurred during a time period.

18. The method of claim 17, wherein the event is generating an error log.

19. The method of claim 17, wherein the event is generating a message.

20. The method of claim 17, wherein the event is a communication with a computer.

* * * * *